United States Patent
Kabasawa

(10) Patent No.: US 6,215,752 B1
(45) Date of Patent: *Apr. 10, 2001

(54) DISK APPARATUS HAVING A SHUTTER ARM FOR PROVIDING A THIN STRUCTURE FOR A DISK DRIVE

(75) Inventor: Hidetoshi Kabasawa, Saitama-ken (JP)

(73) Assignee: TEAC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,905

(22) Filed: Dec. 16, 1997

(30) Foreign Application Priority Data

Dec. 25, 1996 (JP) .................................................. 8-346123
Dec. 25, 1996 (JP) .................................................. 8-346125

(51) Int. Cl.$^7$ .................................................. G11B 17/04
(52) U.S. Cl. .................................................. 369/77.2
(58) Field of Search .................................. 369/77.2, 77.1, 369/75.2, 75.1, 291, 292; 360/99.06, 99.02, 133

(56) References Cited

U.S. PATENT DOCUMENTS

| | | | |
|---|---|---|---|
| 4,992,896 | * | 2/1991 | Inoue et al. .................. 360/99.06 |
| 5,124,975 | * | 6/1992 | Naoki et al. ....................... 369/291 |
| 5,386,406 | * | 1/1995 | Ikuma et al. ...................... 369/77.2 |
| 5,537,271 | * | 7/1996 | Kumai et al. ................... 360/99.06 |
| 5,790,497 | * | 8/1998 | Hayashi ............................ 359/77.1 |
| 5,867,338 | * | 2/1999 | Ohira et al. ....................... 369/75.2 |
| 5,878,013 | * | 3/1999 | Maeda et al. ..................... 369/77.1 |
| 5,901,129 | * | 5/1999 | Takahashi et al. ................ 369/75.2 |
| 5,978,340 | * | 11/1999 | Tanaka et al. .................... 369/75.2 |

FOREIGN PATENT DOCUMENTS

| | | |
|---|---|---|
| 6161660 | 4/1986 | (JP) . |
| 01176363 | 12/1989 | (JP) . |
| 04061060 | 2/1992 | (JP) . |
| 05041016 | 2/1993 | (JP) . |
| 06076443 | 3/1994 | (JP) . |
| 0773559 | 3/1995 | (JP) . |

* cited by examiner

*Primary Examiner*—David L. Ometz
*Assistant Examiner*—Angel Castro
(74) *Attorney, Agent, or Firm*—Ladas & Parry

(57) ABSTRACT

A disk apparatus includes a slide member provided on a chassis such that the slide member is movable relative to the chassis in an inserting direction when a disk cartridge having a shutter is inserted. A shutter arm is provided on the slide member to open the shutter in the cartridge when inserted. The shutter arm has a connecting part, the connecting part being movable between a first position and a second position. The connecting part is connected at the first position to the shutter by the insertion of the cartridge. The connecting part is moved from the first position to the second position in response to the movement of the slide member, so that the shutter in the cartridge is opened by the connecting part.

12 Claims, 20 Drawing Sheets

DISK APPARATUS HAVING A SHUTTER ARM FOR PROVIDING A THIN STRUCTURE FOR A DISK DRIVE

BACKGROUND OF THE INVENTION (1) Field of the Invention

The present invention relates to a disk apparatus wherein one of a CD-ROM and a disk cartridge is held on a disk tray at a loaded position and reproduction or recording for a related disk is carried out by using a pickup unit.

(2) Description of the Related Art

An optical disk is inserted into an optical disk drive, and the optical disk drive reads information from or writes information to the optical disk by using an optical pickup unit. The optical pickup unit emits a light beam to the disk and receives reflection beams from the disk to which the emission beam is applied. When the optical disk drive is operating in a reading mode, the optical pickup unit detects pits in a track of the disk from the reflection beams in order to read data from the disk.

Currently, there are two major types of optical disk drive: a read-only type and a rewritable type. The read-only optical disk drives read information from an optical disk, such as a CD (compact disk) or CD-ROM (compact disk-read-only memory). The rewritable optical disk drives can read information from and write information to an optical disk. Among the rewritable optical disk drives are a write-once disk system and an erasable disk system. The write-once disk system accesses an optical disk such as a CD-R (compact disk-recordable), and can write data to the disk once only. The erasable disk system accesses an optical disk, such as a PD (phase-change material disk) or CD-RW (compact disk-rewritable), and can write data to the disk many times.

Existing optical disk drives are provided for accessing only one of the above-mentioned optical disk types. In order to allow both the read-only disk (CD, CD-ROM) and the rewritable disk (CD-R, PD, CD-RW) to be accessed, it has been necessary to use two or more of the existing optical disk drives in combination. Recently, in order to eliminate such inconvenience, development has started on an optical disk apparatus in which either one of the read-only disk and the rewritable disk can be held on a disk tray at a loaded position and reproduction or recording with respect to a related disk can be carried out. A conventional disk apparatus of this type is known. In the conventional disk apparatus, one of a CD-ROM and a PD disk cartridge can be held on a disk tray at a loaded position and reproduction or recording with respect to a related disk can be carried out.

FIG. 25 shows the conventional disk apparatus of the above-mentioned type, wherein one of the CD-ROM and the disk cartridge is capable of being held on a disk tray at a loaded position.

As shown in FIG. 25, in the conventional disk apparatus, a turntable 2 and an optical pickup unit 3 are provided on a chassis 1. An optical disk (not shown) is clamped with and rotated by the turntable 2. A disk tray 4 is movably supported on the chassis 1, and one of the CD-ROM (not shown) and the disk cartridge (not shown) is inserted in the disk tray 4. The disk tray 4 is arranged such that the tray 4 is movable relative to the chassis 1 between a disk-loaded position and a disk-change position.

The disk tray 4 has a double-tray structure including an inner tray 4a on which the CD-ROM is placed and an outer tray 4b on which the disk cartridge is placed. The inner tray 4a is provided within the outer tray 4b such that the inner tray 4a is vertically movable between a lowered position and a raised position.

In the conventional disk apparatus, when the disk cartridge is inserted in the tray 4, the disk cartridge is placed on the inner tray 4a. The inner tray 4a serves as a holding surface on which the disk cartridge is held. Since the cartridge is snugly fitted in the outer tray 4b, the inner tray 4a has a cut-out portion 4c provided at a front end portion of the inner tray 4a, in order to allow an operator to easily take the cartridge out of the tray 4.

When taking the cartridge out of the tray 4 at the disk-change position, the operator has to manually raise a front edge of the cartridge from the outer tray 4b by pushing upward the front edge of the cartridge from the cut-out portion 4c of the inner tray 4a. For the conventional disk apparatus, the operator takes the cartridge out of the tray 4 in this manner.

In the conventional disk apparatus, the inner tray 4a includes a first circular recess 4a1 in which an optical disk having a 8-cm diameter is fitted, and a second circular recess 4a2 in which another optical disk having a 12-cm diameter is fitted.

In the disk tray 4 of the conventional disk apparatus, the inner tray 4a is set at the raised position within the outer tray 4b due to a actuating force of a spring (not shown). When the CD-ROM is inserted in the tray 4, the CD-ROM is supported on the inner tray 4a at the raised position. On the other hand, when the disk cartridge is inserted in the tray 4, the inner tray 4a is vertically moved to the lowered position by the cartridge. The disk cartridge is supported on the outer tray 4b, and the inner tray 4a at the lowered position is placed beneath the bottom of the cartridge within the outer tray 4b.

In the conventional disk apparatus, a support plate 5 is provided on the disk tray 4, and an upper area located above the chassis 1 is enclosed by the support plate 5. A shutter lever 6 is rotatably supported on a bottom surface of the support plate 5. The shutter lever 6 serves to open a shutter in the disk cartridge after the cartridge is inserted in the tray 4 and the tray 4 is moved from the disk-change position to the disk-loaded position.

In the above-described conventional disk apparatus, the shutter lever 6 on the bottom surface of the support plate 5 is rotated by the cartridge to open the shutter in the cartridge in response to a rearward movement of the tray 4. After the shutter lever 6 passes over the turntable 2 during the rearward movement of the tray 4, the shutter in the cartridge is fully opened by the shutter lever 6. It is required that in the conventional disk apparatus a height of the tray 4 at which the shutter in the cartridge is opened by the shutter lever 6 be higher than the turntable so as to avoid interference of the shutter lever 6 with the turntable 2 during the rearward movement of the tray.

Further, in the conventional disk apparatus, the support plate 5 on which the shutter lever 6 is rotatably supported is required. It is necessary that in the conventional disk apparatus an additional space above the chassis 1 is provided for installing the support plate 5 therein. This makes it difficult for the conventional disk apparatus to provide a thin structure for an optical disk drive housed in a notebook-size personal computer.

Recently, notebook-size personal computers having a built-in optical disk drive as standard equipment have been widespread, and there is a demand for reducing the entire thickness of the built-in optical disk drive for use in the notebook-size personal computers.

SUMMARY OF THE INVENTION

An object of the present invention is to provide an improved disk apparatus in which the above-described problems are eliminated.

Another object of the present invention is to provide a disk apparatus which provides a thin structure for an optical disk drive housed in a personal computer while the disk apparatus is capable of opening a shutter in a disk cartridge when the cartridge is inserted, in order to allow a pickup unit to access a disk contained in the cartridge.

The above-mentioned objects of the present invention are achieved by a disk apparatus which comprises: a chassis which has a base; a slide member which is provided on the chassis such that the slide member is movable relative to the chassis in an inserting direction when a disk cartridge having a shutter is inserted; and a shutter arm which is provided on the slide member to open the shutter in the cartridge when inserted, the shutter arm having a connecting part, the connecting part being movable between a first position and a second position, the connecting part being connected at the first position to the shutter by the insertion of the cartridge, the connecting part being moved from the first position to the second position in response to the movement of the slide member, so that the shutter in the cartridge is opened by the connecting part.

In the disk apparatus of the present invention, a thickness of the shutter arm is nearly equal to a thickness of the cartridge, and the shutter arm does not vertically project from the slide member (or the disk tray) during the rotation of the connecting part of the shutter arm. A support plate for supporting a shutter lever thereon as in the conventional disk apparatus is not required by the disk apparatus of the present invention. In addition, it is not necessary to provide an additional space above the slide member for installing the shutter arm. Therefore, the disk apparatus of the present invention is effective in providing a thin structure for an optical disk drive housed in a computer while the shutter arm is capable of opening the shutter in the cartridge when the cartridge is inserted.

BRIEF DESCRIPTION OF THE DRAWINGS

The above and other objects, features and advantages of the present invention will be more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 1:
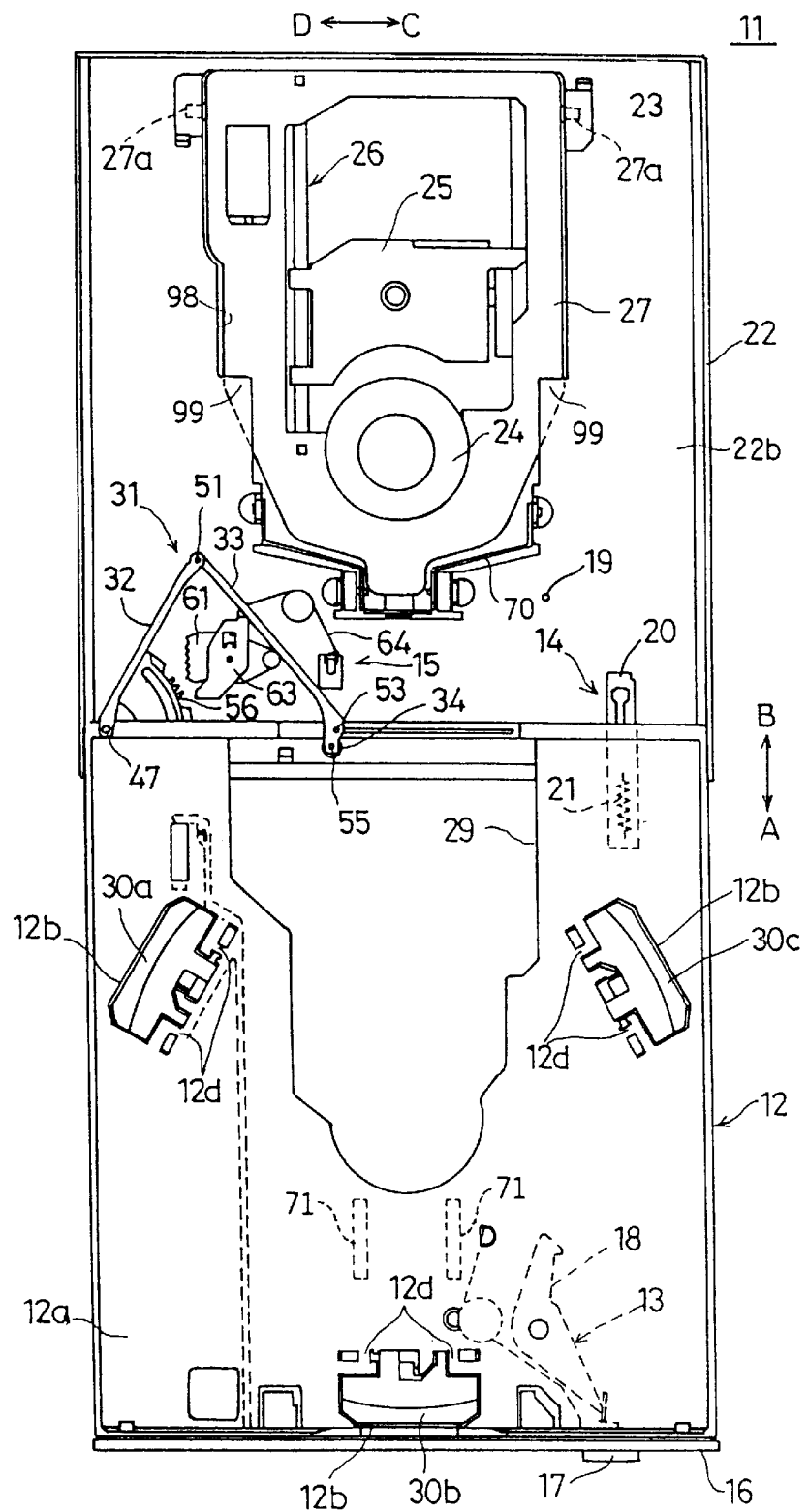
FIG. 1 is a top view of a first embodiment of a disk apparatus of the present invention in which a disk tray is pulled open.
Figure 2:
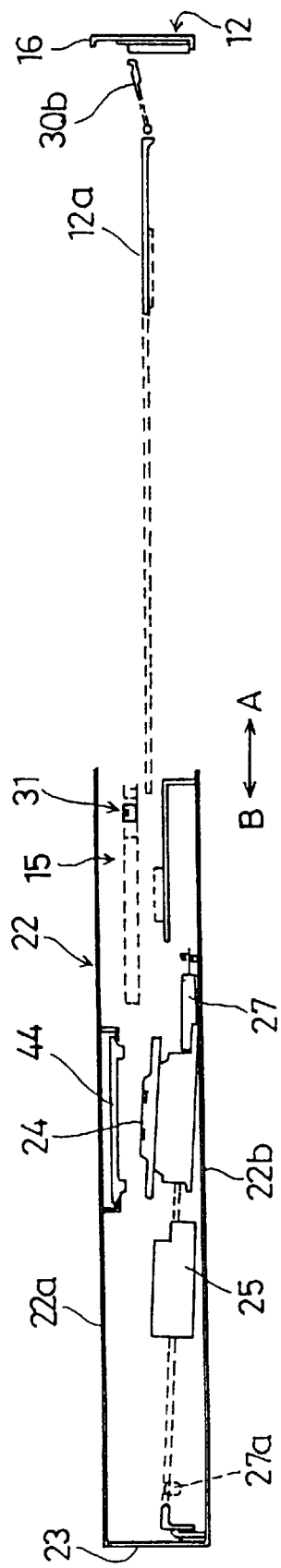
FIG. 2 is a cross-sectional view of the disk apparatus of FIG. 1.
Figure 3:
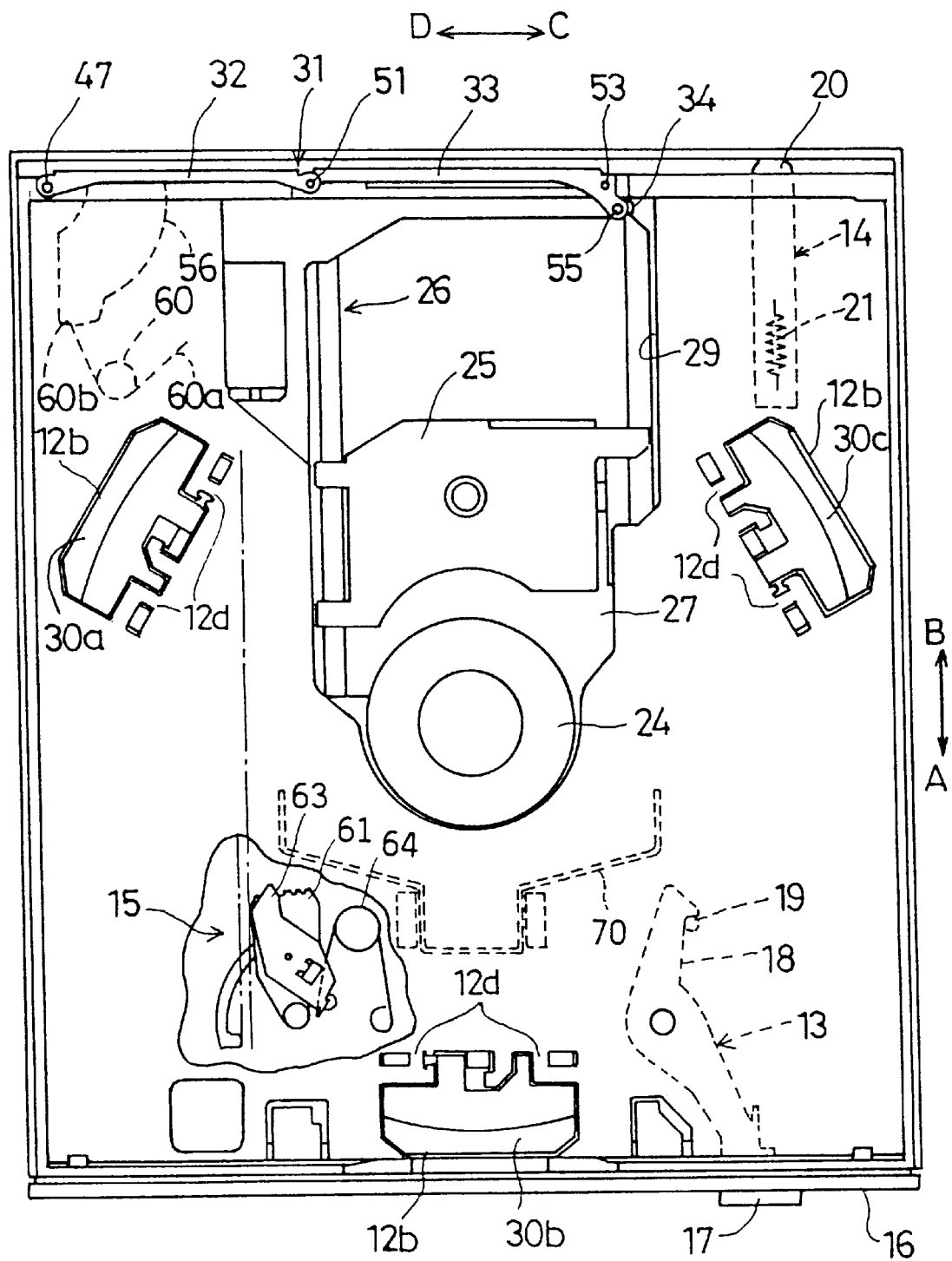
FIG. 3 is a top view of the disk apparatus of FIG. 1 in which the disk tray is moved to a disk-loaded position.
Figure 4:
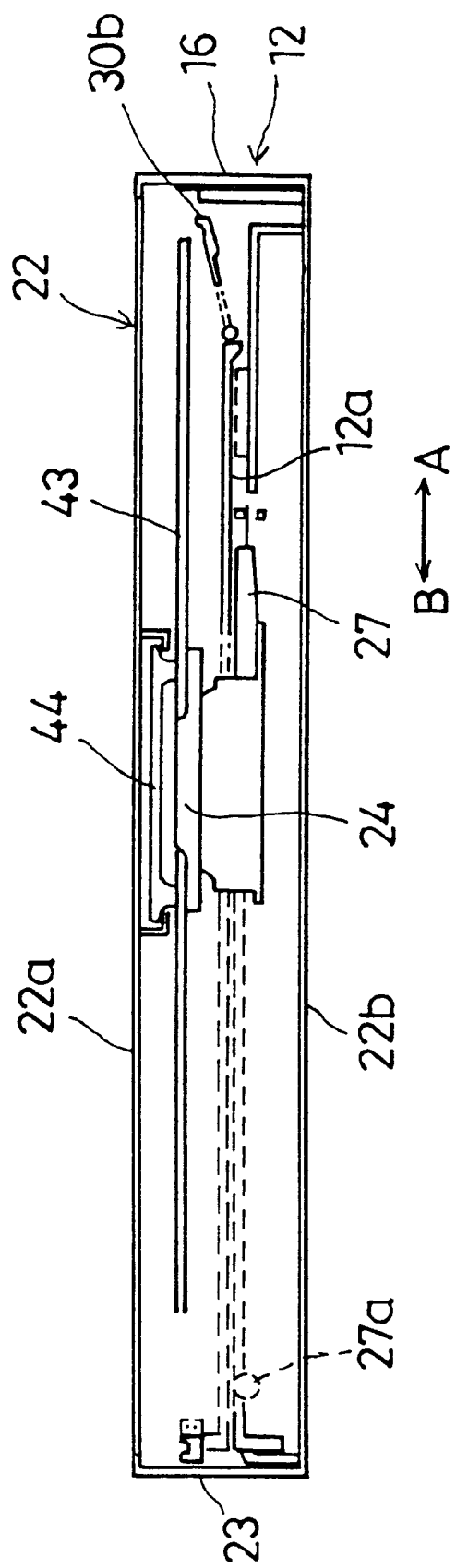
FIG. 4 is a cross-sectional view of the disk apparatus of FIG. 3.

FIG. 1 shows a first embodiment of a disk apparatus 11 of the present invention in which a disk tray is pulled open. FIG. 2 is a cross-sectional view of the disk apparatus 11. FIG. 3 shows the disk apparatus 11 in which the disk tray is set at a loaded position. FIG. 4 is a cross-sectional view of the disk apparatus of FIG. 3.

The disk apparatus 11 is used as an external disk drive housed in a personal computer (not shown).

The disk apparatus 11 comprises a disk tray 12 on which one of a CD-ROM and a PD disk cartridge 45 is held. The disk tray 12 is arranged such that the tray 12 is movable between a disk-loaded position and a disk-change position in one of an ejecting direction, indicated by the arrow "A" in FIGS. 1–4, and an inserting direction, indicated by the arrow "B" in FIGS. 1–4. The disk tray 12 in the present embodiment corresponds to a slide unit recited in the claims.

The CD-ROM is a type of optical disk and the CD-ROM is designated by reference numeral 43. The disk cartridge 45 contains an optical disk (such as a PD) therein and the optical disk in the disk cartridge 45 is also designated by reference numeral 43.

The disk apparatus 11 comprises a tray locking unit 13 which locks the disk tray 12 at the disk-loaded position, a tray pressing unit 14 which presses the disk tray 12 in the ejecting direction A, and a shutter open/close unit 15 which opens or closes a shutter in the disk cartridge 45.

When the disk tray 12 is set at the disk-loaded position and placed within a chassis 22, as shown in FIG. 3, a lock lever 18 provided on a bottom surface (or a reverse-side surface) of the disk tray 12 is connected to a connecting pin 19 on the chassis 22. Thus, the tray locking unit 13 locks the disk tray 12 at the disk-loaded position.

The tray locking unit 13 unlocks the disk tray 12 when an eject button 17 on a front bezel 16 is pressed by an operator. When the eject button 17 is pressed, the lock lever 18 on the back side of the disk tray 12 is disconnected from the connecting pin 19 on the chassis 22, so that the tray locking unit 13 unlocks the disk tray 12.

The tray pressing unit 14 includes a pressing lever 20 and a helical spring 21. When the tray locking unit 13 unlocks the disk tray 12, the pressing lever 20 pushes a rear end wall 23 of the chassis 22 due to an actuating force of the spring 21 so that the disk tray 12 is moved relative to the chassis 22 in the ejecting direction A by the pressing lever 20. This makes it possible that the operator easily pulls the disk tray 12 out of the chassis 22 and moves the disk tray 12 to the disk-change position, as shown in FIG. 1.

As shown in FIG. 1, on the bottom surface of the chassis 22, a movable base 27 (or called a traverse unit 27) is provided such that the movable base 27 is vertically rotatable around a shaft 27a at a rear end of the movable base 27. The movable base 27 includes a turntable 24, an optical pickup unit 25 and a pickup drive 26 which are provided on the movable base 27. The turntable 24 is rotated by a motor (not shown) so as to rotate an optical disk on the turntable 24 around a center of the turntable 24. The pickup unit 25 is used to read data from or write data to a recording layer of the optical disk. The pickup drive 26 controls operation of the pickup unit 25.

A movable base lifting unit 70 is provided on the bottom surface of the chassis 22. The shaft 27a of the movable base 27 is provided at a rear end portion of the chassis 22. The movable base 27 is provided such that a front end of the movable base 27 is vertically moved up and down by the movable base drive unit 70 in response to the rearward and forward movements of the disk tray 12. Specifically, the front end of the movable base 27 is moved down as shown in FIG. 2 in response to the forward movement of the disk tray 12 wherein the disk tray 12 is moved forward to the disk-change position. The front end of the movable base 27 is moved up as shown in FIG. 4 by the movable base lifting unit 70 in response to the rearward movement of the disk tray 12 wherein the disk tray 12 is moved rearward to the disk-loaded position.

A base 22b of the chassis 22 includes an opening 98 having a configuration in conformity with the turntable 24, the pickup unit 25 and the pickup drive 26. The opening 98 has a pair of contact portions 99 provided at right and left side edges of the opening 98. The contact portions 99 extend inwardly from the side edges of the opening 98. When the front end of the movable base 27 is moved up, the movable base 27 is brought into contact with the contact portions 99 so that the disk 43 on the turntable 24 in the movable base 27 is positioned at a read/write position.

As shown in FIG. 4, the disk tray 12 is set at the disk-loaded position and the movable base 27 is moved up, and the turntable 24 in the movable base 27 brings the disk 43 (one of the CD-ROM and the disk cartridge 45) on the disk tray 12 into contact with a clamper 44. The clamper 44 is provided on a top plate 22a of the chassis 22, and the disk 43 at this time is clamped between the turntable 24 and the clamper 44. The pickup unit 25 is used to read data from or write data to a recording layer of the disk 43 being clamped.

The disk tray 12 has a cartridge holding surface 12a on which the disk cartridge 45 is placed. The cartridge holding surface 12a includes an opening 29 having a configuration in conformity with the turntable 24, the pickup unit 25 and the pickup drive 26.

As shown in FIG. 1 and FIG. 3, in the disk apparatus 11 of the present embodiment, a plurality of disk supporting members 30 are provided on the disk tray 12 around the periphery of the opening 29. In the present embodiment, the plurality of disk supporting members 30 are three disk supporting members 30a–30c which are arranged on the tray 12 in a radial formation (or at 120-degree intervals) around the center of the disk 43 or the disk cartridge 45 held on the tray 12.

The disk tray 12 includes a plurality of openings 12b in the cartridge holding surface 12a which are arranged in a radial formation in conformity with the disk supporting members 30. In the present embodiment, the plurality of openings 12b are three openings arranged in a radial formation (or at 120-degree intervals) around the center of the disk 43 or the disk cartridge 45. As shown in FIG. 1 and FIG. 3, the disk supporting members 30a–30c are provided in the openings 12b of the tray 12.

The disk tray 12 includes a plurality of bearing portions 12d in the cartridge holding surface 12a which are respectively provided adjacent to the openings 12b. The disk supporting members 30a–30c have the same configuration, and they are rotatably supported on the cartridge holding surface 12a of the tray 12 by the bearing portions 12d. Each of the disk supporting members 30 has a helical torsion spring (not shown in FIGS. 14), and the helical torsion spring exerts an actuating force on a respective one of the disk supporting members 30 such that the disk supporting members 30 are actuated to disk-support positions by the springs. When the disk supporting members 30 are set at the disk-support positions, the disk supporting members 30 extend upward from the openings 12b of the tray 12.

In the disk apparatus 11 of the present embodiment, when the disk cartridge 45 is inserted in the disk tray 12, the disk supporting members 30 are rotated downward to horizontal positions by a weight of the cartridge 45 against the actuating force of the springs. When the disk supporting members 30 are set at the horizontal positions, the disk supporting members 30 are included in the openings 12b of the tray 12. The disk supporting members 30 at this time are located below the top of the cartridge holding surface 12a of the tray 12.

Each of the disk supporting members 30 in the present embodiment is vertically rotatable around a rotating axis of a rotatable shaft between the disk-support position and the horizontal position.

Figure 5A:
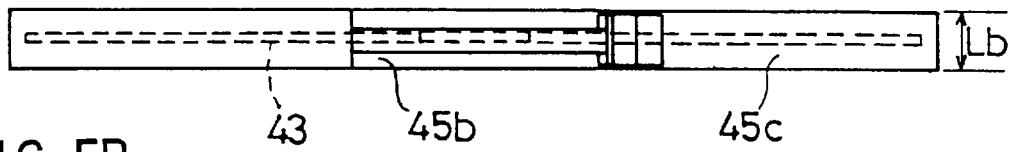
FIG. 5A and FIG. 5B are enlarged top and front views of a disk cartridge.
Figure 5B:
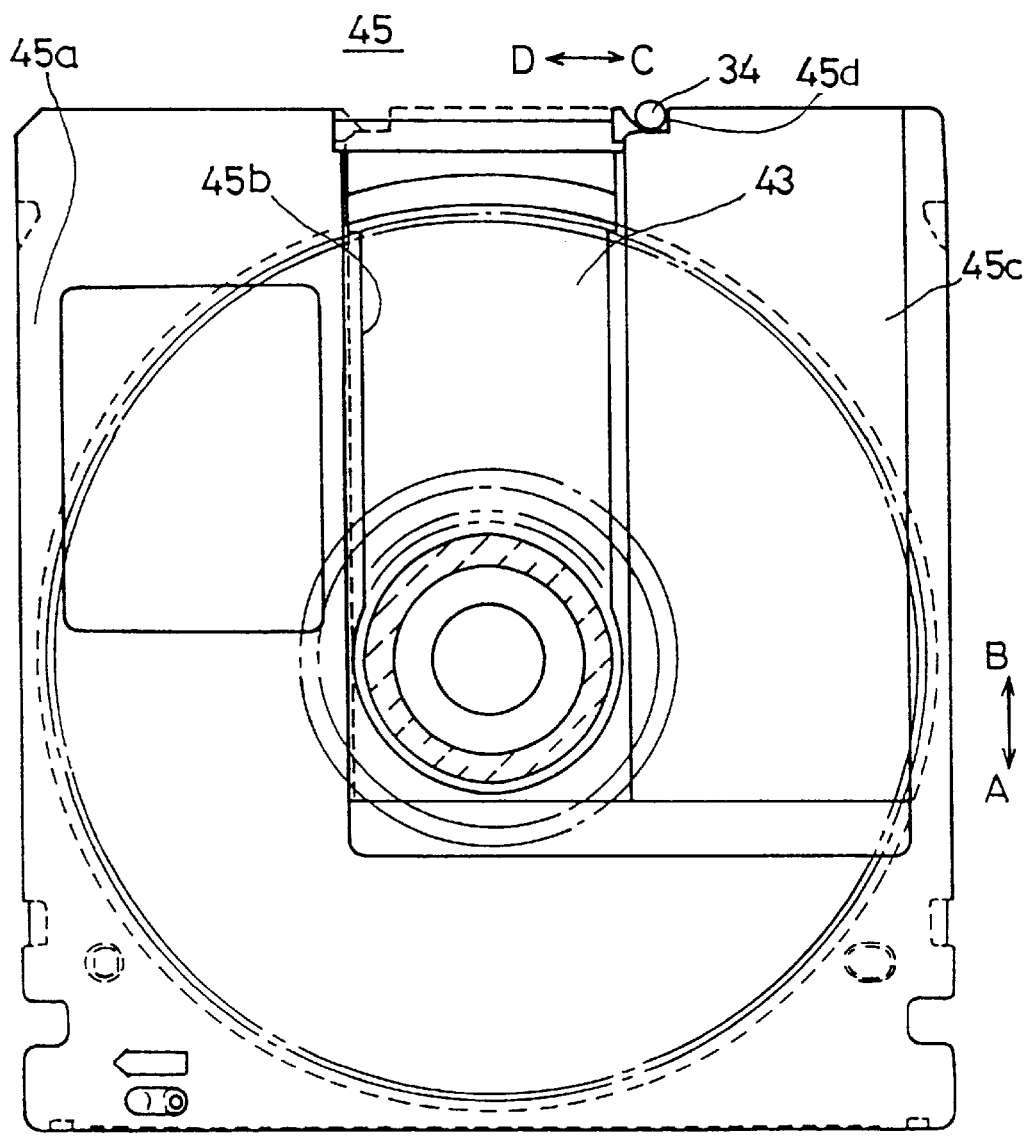

FIG. 5A and FIG. 5B shows a configuration of the disk cartridge 45.

As shown in FIG. 5A and FIG. 5B, the disk cartridge 45 comprises a case 45a which encloses the optical disk 43 therein. The case 45a has a front surface and a rear surface each of which includes a rectangular opening 45b. The openings 45b on the front and rear surfaces of the case 45a extend in a radial direction of the disk 43. The openings 45b in the case 45a allow the optical pickup unit 25 to access the disk 43 for recording or reproduction.

The disk cartridge 45 comprises a shutter 45c provided to open or close the openings 45b in the case 45a. The shutter 45c is attached to the case 45a, and the shutter 45c is movable relative to the case 45a in one of an opening direction, indicated by the arrow "C" in FIG. 5B, and a closing direction, indicated by the arrow "D" in FIG. 5B. When the cartridge 45 is not held on the disk tray 12, the shutter 45c is set at a closed position due to an actuating force of a spring (not shown) so that the openings 45b in the case 45a are closed by the shutter 45c. When the cartridge 45 is held on the disk tray 12 at the disk-loaded position, the shutter 45c is moved in the direction C and set at an open position by the shutter open/close unit 15 so that the openings 45b in the case 45a are open.

As shown in FIG. 1 and FIG. 3, a shutter arm 31 is provided at a rear end portion of the disk tray 12, and the shutter arm 31 is rotatably supported on the disk tray 12. When the cartridge 45 is held on the disk tray 12 at the disk-loaded position, the shutter arm 31 is actuated by the shutter open/close unit 15 so as to move the shutter 45c of the cartridge 45 to the open position.

The shutter arm 31 comprises a first arm 32, a second arm 33 and a connecting roller 34. The first arm 32 is rotatably supported at the rear end corner of the disk tray 12, and the first arm 32 is rotated clockwise in response to the rearward movement of the tray 12. The second arm 33 is rotatably linked with an end of the first arm 32, and the second arm 33 is rotated in accordance with the rotation of the first arm 32. The connecting roller 34 is provided at an end of the second arm 33, and the connecting roller 34 is connected to the shutter 45c of the disk cartridge 45. The connecting roller 34 is movable between a first position (see FIG. 8) and a second position (see FIG. 11) along a rear end wall of the disk tray 12 in one of the direction C and the direction D by the rotation of the shutter arm 31 in response to the forward or rearward movement of the tray 12.

Figure 6:
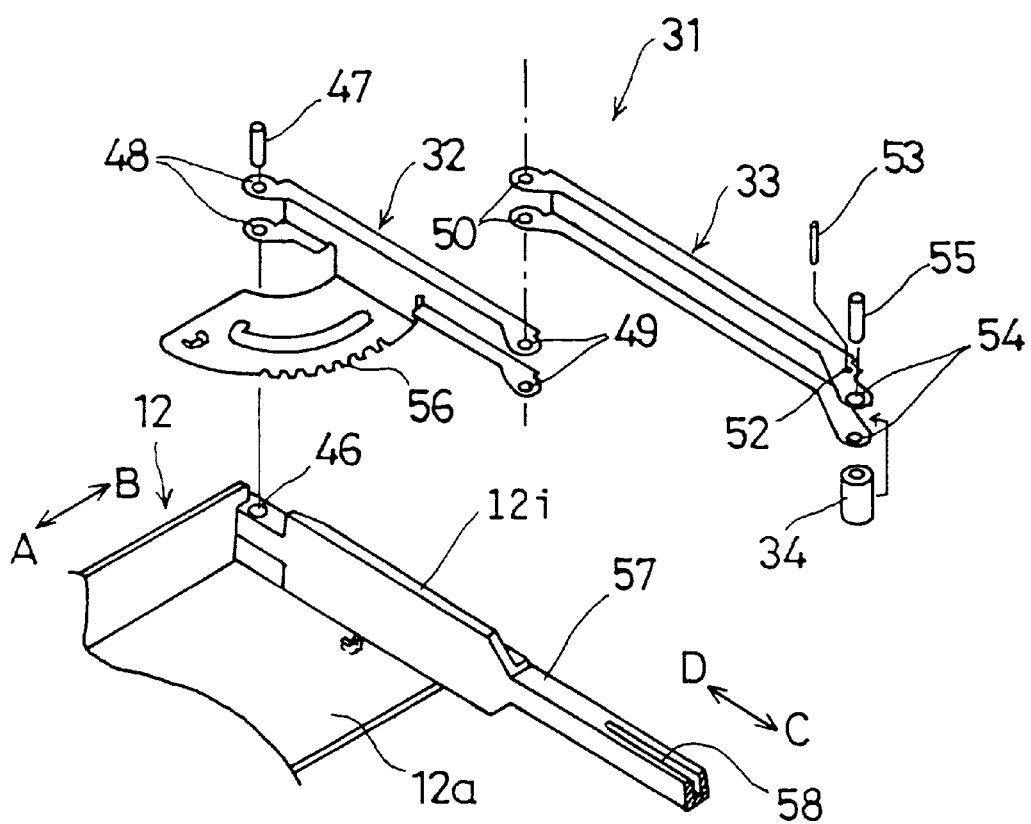
FIG. 6 is an exploded view of a shutter arm in the disk apparatus.

Next, FIG. 6 shows a configuration of the shutter arm 31 in the shutter open/close unit 15 of the disk apparatus 11.

Figure 7:
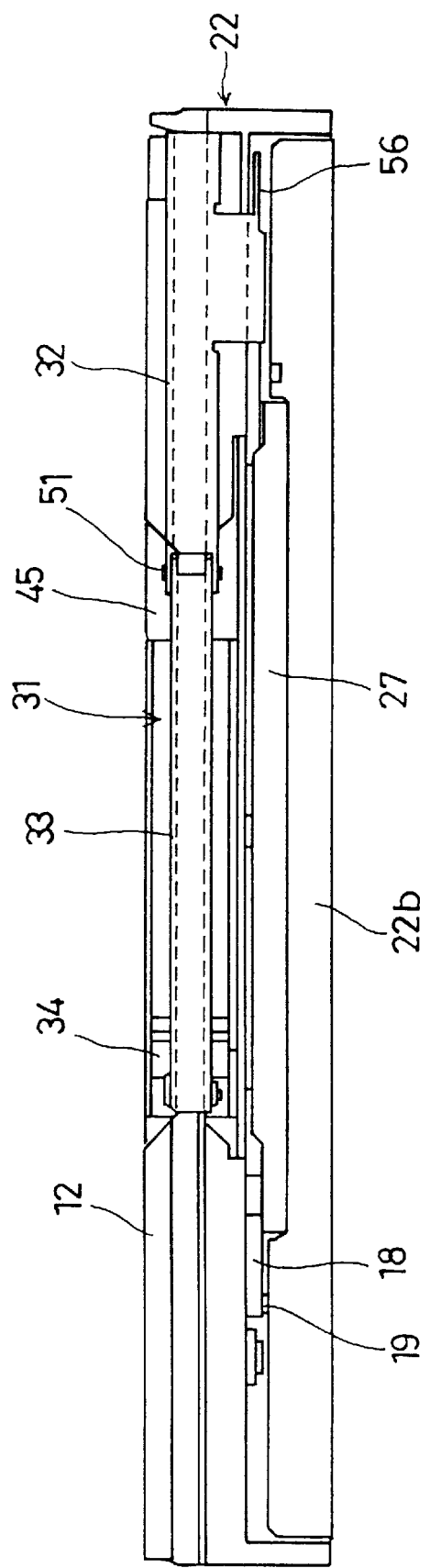
FIG. 7 is a rear view of the disk tray in which the shutter arm is installed.
Figure 8:
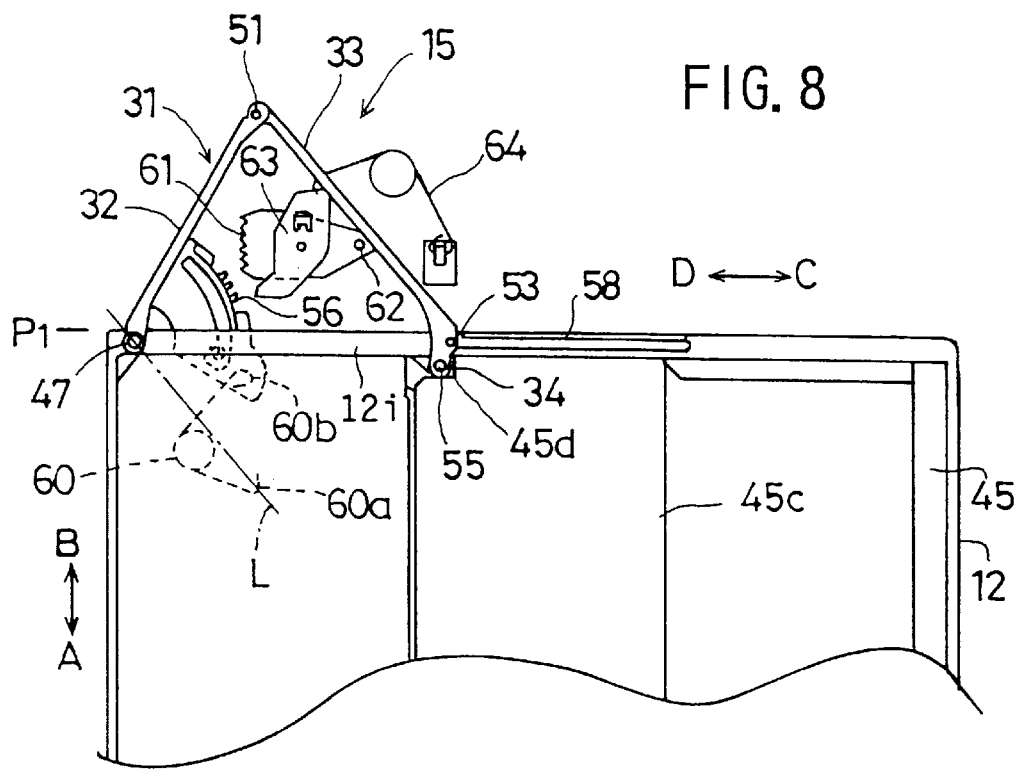
FIG. 8 is a diagram for explaining a condition of a shutter open/close unit before the disk cartridge is inserted in the disk tray.

FIG. 7 is a rear view of the disk tray 12 in which the shutter arm 31 is installed. FIG. 8 shows a condition of the shutter open/close unit 15 before the disk cartridge 45 is inserted in the disk tray 12.

The shutter arm 31 comprises a pin 47 which is fitted into a small hole 46 at one end of a rear surface 12i of the tray 12. The first arm 32 includes a pair of small holes 48 at one end of the first arm 32, and the pin 47 is inserted in the small holes 48 of the first arm 32 such that the first arm 32 is rotatably supported at the rear end corner of the tray 12 and rotatable around the pin 47. The first arm 32 includes a pair of small holes 49 at the other end of the first arm 32, and the small holes 49 are linked with the second arm 33.

The second arm 33 includes a pair of burring portions 50 at one end of the second arm 33, and the burring portions 50 are crimped so as to produce crimped portions 51 as shown in FIG. 7. The crimped portions 51 extend upward from the top of the second arm 33 and extend downward from of the bottom of the second arm 33. The burring portions 50 of the second arm 33 are fitted into the small holes 49 of the first arm 32, and the crimping of the burring portions 50 is performed such that the second arm 33 is rotatably supported at the end 49 of the first arm 32 and rotatable around the crimped portions 51 of the second arm 33.

The shutter arm 31 comprises a guide pin 53 and a rotatable shaft 55. The second arm 33 includes a small hole 52, and the guide pin 53 is fitted into the small hole 52 of the second arm 33. The second arm 33 includes a pair of small holes 54 at the other end of the second arm 33, and the shaft 55 is fitted into the small holes 54 of the second arm 33. The connecting roller 34 is rotatably supported on the shaft 55.

In the shutter arm 31, the base of the first arm 32 is rotatably supported at the end of the rear surface 12i of the tray 12 by the pin 47. The base of the second arm 33 is rotatably supported on the end of the first arm 32. The leading edge of the second arm 33 is movably guided along the rear surface 12i of the tray by the guide pin 53. The connecting roller 34 at the end of the second arm 33 is movable between the first position (shown in FIG. 8) and the second position (shown in FIG. 11) along the rear surface 12i of the tray 12 in one of the direction C and the direction D by the rotation of the shutter arm 31 in response to the forward or rearward movement of the tray 12. Thus, the shutter open/close unit 15 opens or closes the shutter 45c in the cartridge 45 by the connection of the connecting roller 34 and the shutter 45c in response to the rotation of the first arm 32 around the pin 47.

As shown in FIG. 7, a thickness of the shutter arm 31, including the first arm 32 and the second arm 33, is nearly equal to the thickness of the cartridge 45, and the shutter arm 31 does not vertically project from the rear surface 12i of the tray 12 during the rotation of the first arm 32 around the pin 47. Thus, it is not necessary to provide an additional space above the tray 12 for installing the shutter arm 31. The disk apparatus 11 of the present embodiment is effective in providing a thin structure for an optical disk drive housed in a notebook-size computer.

In the shutter arm 31, the first arm 32 and the second arm 33 have a U-shaped cross section and are produced by bending of a sheet-metal material. The shutter arm 31 may be formed with a light weight while a sufficient strength of the shutter arm 31 is ensured. In the shutter arm 31, the pin 47, the crimped portions 51, the guide pin 53 and the shaft 55 are fitted in the holes 48, the holes 49, the hole 52 and the holes 54, respectively. Further, as shown in FIG. 6, the first arm 32 includes a gear 56 integrally formed with the bottom of the first arm 32. The gear 56 has a generally quadrant configuration, and a center of the gear 56 is located at the end of the first arm 32 or at the shaft 47. The gear 56 extends laterally from an intermediate portion of the first arm 32. The first arm 32 is rotated around the pin 47 by engagement of the gear 56 with a rack 61 on the chassis 22 in response to the movement of the tray 12.

As shown in FIG. 6, in the rear surface 12i of the tray 12, an arm receiving portion 57 extending along the rear surface 12i in the direction C is provided. The first arm 32 and the second arm 33, each having a U-shaped cross section and a recessed part therein, are joined onto the arm receiving portion 57 of the rear surface 12i when the supporting roller 34 is set at the second position (shown in FIG. 11), such that a position of the shutter arm 31 substantially accords with a position of the rear surface 12i of the tray 12. A guide groove 58 extending in the direction C is provided on the top of the arm receiving portion 57 of the rear surface 12i of the tray 12. The guide pin 53 at the end of the second arm 33 is fitted in the guide groove 58 such that the guide pin 53 is movable along the rear surface 12i of the tray 12 when the first arm 32 is rotated around the shaft 47. As described above, the connecting roller 34 provided on the shaft 55 at the leading edge of the second arm 33 is movable between the first position (shown in FIG. 8) and the second position (shown in FIG. 11) along the rear surface 12i of the tray 12 in one of the direction C and the direction D by the rotation of the shutter arm 31 in response to the forward or rearward movement of the tray 12. Thus, the shutter open/close unit 15 opens or closes the shutter 45c in the cartridge 45 by the connection of the connecting roller 34 and the shutter 45c in response to the rotation of the first arm 32 around the pin 47.

A helical torsion spring 60, which is indicated by a dotted line in FIG. 8, has an end 60a fitted to the bottom of the tray 12, and the other end 60b fitted to the leading edge of the gear 56 of the first arm 32. When the shutter open/close unit 15 is in the condition of FIG. 8, the end 60b of the spring 60 is located on the right side of a line "L" (indicated by a one-dot chain line in FIG. 8) interconnecting the position of the pin 47 and the position of the end 60a of the spring 60. The spring 60 at this time exerts an actuating force on the first arm 32 such that the first arm 32 is actuated to the condition of FIG. 8 by the spring 60. The first arm 32 in the condition of FIG. 8 is actuated due to the actuating force of the spring 60 so as to be rotated counterclockwise around the pin 47. The second arm 33 in the condition of FIG. 8 is also actuated due to the actuating force of the spring 60 so as to be rotated clockwise around the guide pin 53.

Accordingly, before the cartridge 45 is inserted in the tray 12, the first arm 32 and the second arm 33 are held in an L-shaped condition as shown in FIG. 8. The connecting roller 34 at this time is located at the end of the guide groove 58 in the direction D, and is waiting for insertion of the cartridge 45 in the tray 12.

As shown in FIG. 8, the rack 61 is rotatably supported on the base 22b of the chassis 22 by a shaft 62. The gear 56 of the first arm 32 is engaged with the rack 61 in response to the movement of the tray 12. A rack locking plate 63 is provided on the chassis 22 to lock the rack 61 at a locking position. A helical torsion spring 64 is provided on the chassis 22. One end of the spring 64 is fixed to the chassis 22, and the other end of the spring 64 is fixed to the rack locking plate 63. The spring 64 exerts an actuating force on the rack locking plate 63 such that the rack locking plate 63 is rotated clockwise around a shaft of the rack locking plate 63 by the spring 64. As the rack locking plate 63 at the locking position shown in FIG. 8 is connected to the rack 61, the rotation of the rack locking plate 63 by the spring 64 is inhibited by the rack 61.

The rack locking plate 63 is rotated clockwise around the shaft of the rack locking plate 63 to an unlocking position (shown in FIG. 3) by a rib (not shown) downwardly extending from the bottom of the tray 12 when the tray 12 is moved relative to the chassis 22 in the direction B. As the rack locking plate 63 is rotated clockwise to the unlocking position shown in FIG. 3, the rack 61 is also rotated clockwise together with the rack locking plate 63. When the rack 61 is rotated to the position shown in FIG. 3, the gear 56 of the first arm 32 is disconnected from the rack 61 and the rack 61 is separated from the gear 56.

Figure 9:
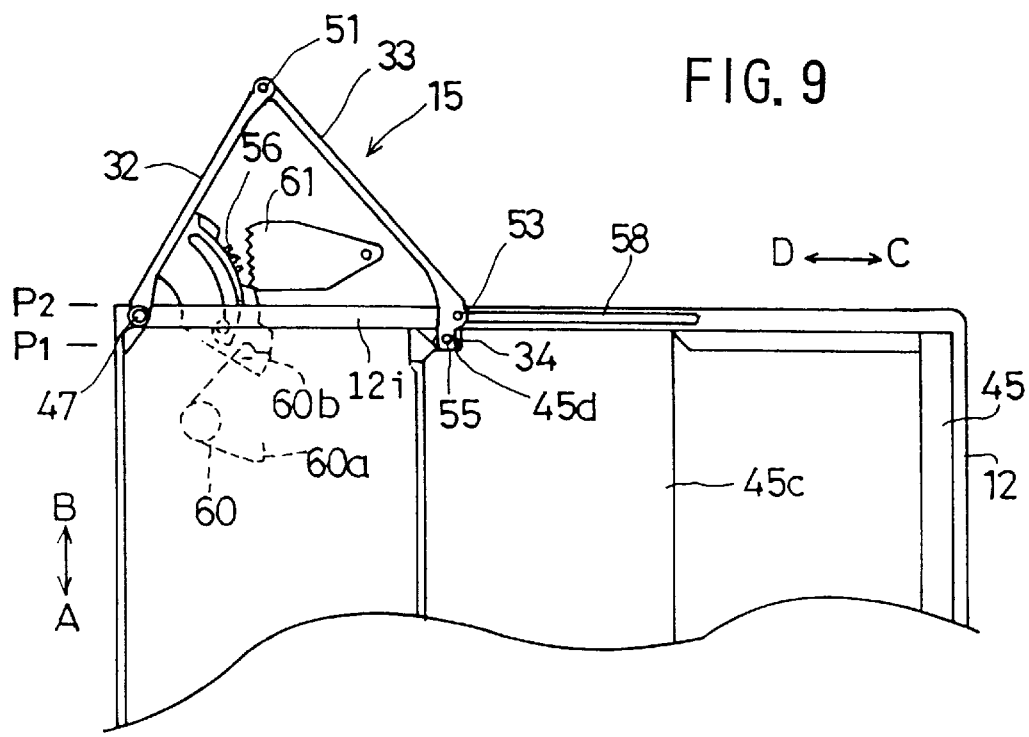
FIG. 9 is a diagram for explaining a condition of the shutter open/close unit when a gear of the shutter open/close unit is engaged with a rack on a chassis.
Figure 10:
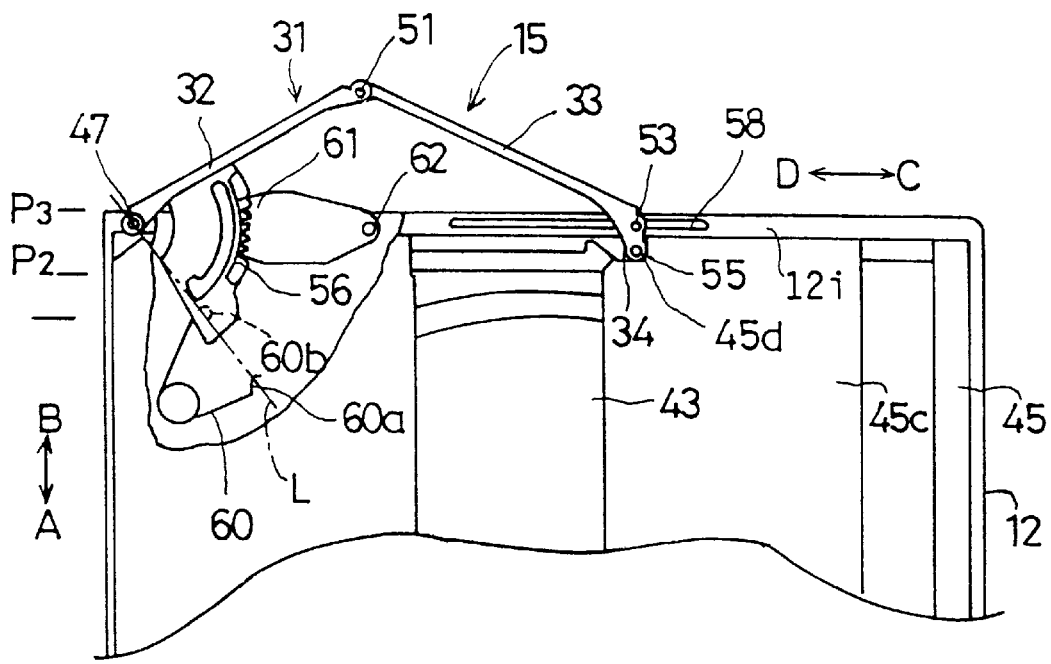
FIG. 10 is a diagram for explaining an operation of the shutter open/close unit to open a shutter in the cartridge in response to a movement of the tray.
Figure 11:
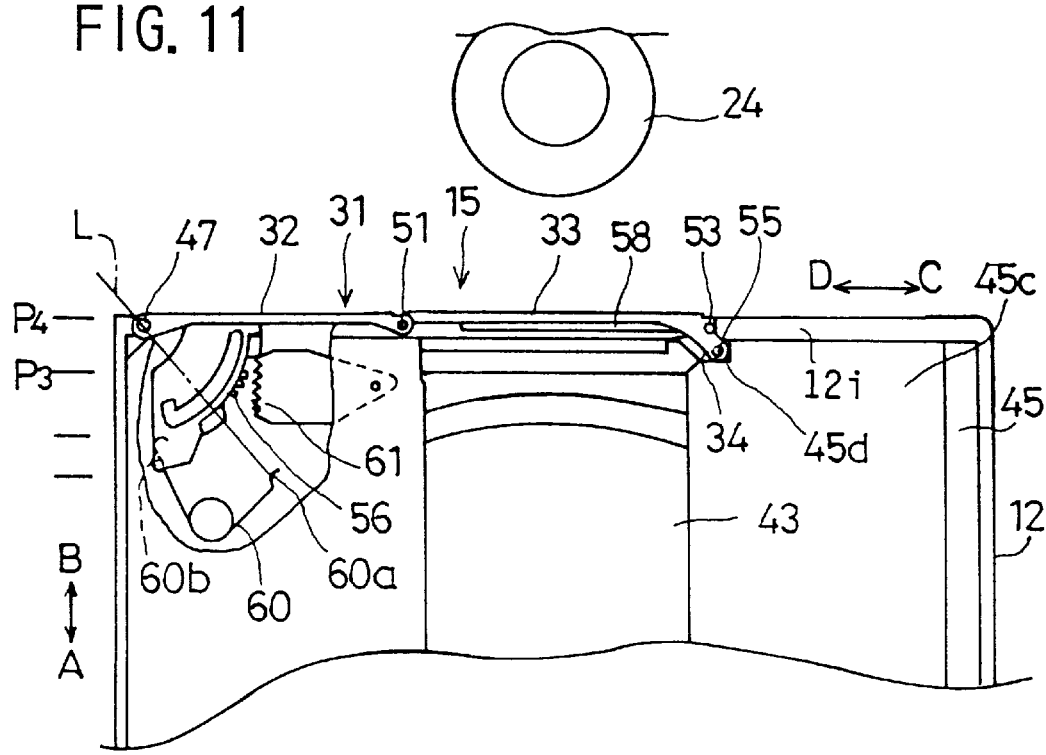
FIG. 11 is a diagram for explaining a condition of the shutter open/close unit when the shutter in the cartridge is fully open.

Next, FIG. 9 shows a condition of the shutter open/close unit 15 when the gear 56 of the shutter open/close unit 15 is engaged with the rack 61 on the chassis 22. FIG. 10 shows an operation of the shutter open/close unit 15 to open the shutter 45c in the disk cartridge 45 in response to a movement of the tray 12. FIG. 11 shows a condition of the shutter open/close unit 15 when the shutter 45c in the cartridge 45 is fully open.

When the rear surface 12i of the tray 12 is at a position "P1" indicated in FIG. 8, the tray 12 is set at the disk-change position. If the cartridge 45 is inserted in the tray 12, the connecting roller 34 of the shutter open/close unit 15 is connected to a connecting portion 45d of the shutter 45c in the cartridge 45 as shown in FIG. 8. When the tray 12 is moved in the direction B to a position "P2" indicated in FIG. 9, the gear 56 of the first arm 32 starts engagement with the rack 61 on the chassis 22.

When the tray 12 is further moved in the direction B to a position "P3" indicated in FIG. 10, the first arm 32 is rotated clockwise around the pin 47 by the engagement of the gear 56 and the rack 61. As the second arm 33 is linked with the first arm 32 via the crimped portions 51, the second arm 33 is rotated counterclockwise around the guide pin 53. The guide pin 53 is moved along the guide groove 58 in the direction C. The connecting roller 34 is also moved along the guide grove 58 in the direction C by the rotation of the first arm 32, so that the shutter 45c in the cartridge 45 is opened by the connecting roller 34 due to the connection of the roller 34 and the connecting portion 45d.

When the tray 12 is further moved in the direction to a position "P4" indicated in FIG. 11, the first arm 32 and the second arm 33 in the shutter open/close unit 15 are rotated so as to extend along the rear surface 12i of the tray 12 in the direction C. Accordingly, after the cartridge 45 is inserted in the tray 12, the first arm 32 and the second arm 33 are held in a straight-line condition shown in FIG. 11. When the shutter arm 31 is in the straight-line condition, the supporting roller 34 at the leading edge of the second arm 33 is set at the second position shown in FIG. 11. As described above, when the supporting roller 34 is set at the second position shown in FIG. 11, the shutter arm 31 is joined onto the rear surface 12i of the tray 12 such that the position of the shutter arm 32 substantially accord with the position of the rear surface 12i of the tray 12.

When the shutter open/close unit 15 is in the condition of FIG. 11, the shutter 45c in the cartridge 45 is fully open. As the disk 43 in the cartridge 45 is exposed by the shutter 45c at the open position, this allows the optical pickup unit 25 to be used to access the disk 43 to read data from or write data to the disk 43. The cartridge 45 held on the tray 12 at this time is located in front of the turntable 24. Before the shutter 45c passes over the turntable 24 during the rearward movement of the tray 12, the shutter 45c in the cartridge 45 is fully open.

As the shutter open/close unit 15 is in the condition of FIG. 11 and the shutter 45c in the cartridge 45 is fully opened by the connecting roller 34, the first arm 32 and the second arm 33 are held in the straight-line condition due to the actuating force of the spring 60. When the shutter open/close unit 15 is in the condition shown in FIG. 10, the end 60b of the spring 60 is located on the line "L" (indicated by a one-dot chain line in FIG. 10) interconnecting the position of the pin 47 and the position of the end 60a of the spring 60. The spring 60 at this time exerts the actuating force on the first arm 32 such that the first arm 32 is actuated toward the pin 47 by the spring 60.

When the shutter open/close unit 15 is in the condition shown in FIG. 11, the end 60b of the spring 60 is located on the left side of the line "L" interconnecting the position of the pin 47 and the position of the end 60a of the spring 60. The spring 60 at this time exerts the actuating force on the first arm 32 such that the first arm 32 is rotated clockwise around the pin 47 by the spring 60. Thus, the first arm 32 and the second arm 33 are held in the straight-line condition due to the actuating force of the spring 60.

As described above, the gear 56 of the first arm 32 is engaged with the rack 61 on the chassis 22 in response to the rearward movement of the tray 12, and the connecting roller 34 in the shutter open/close unit 15 can quickly open the shutter 45c in the cartridge 45. In addition, before the shutter 45c passes over the turntable 24 during the rearward movement of the tray 12, the shutter 45c in the cartridge 45 is fully opened by the connecting roller 34.

Figure 25:
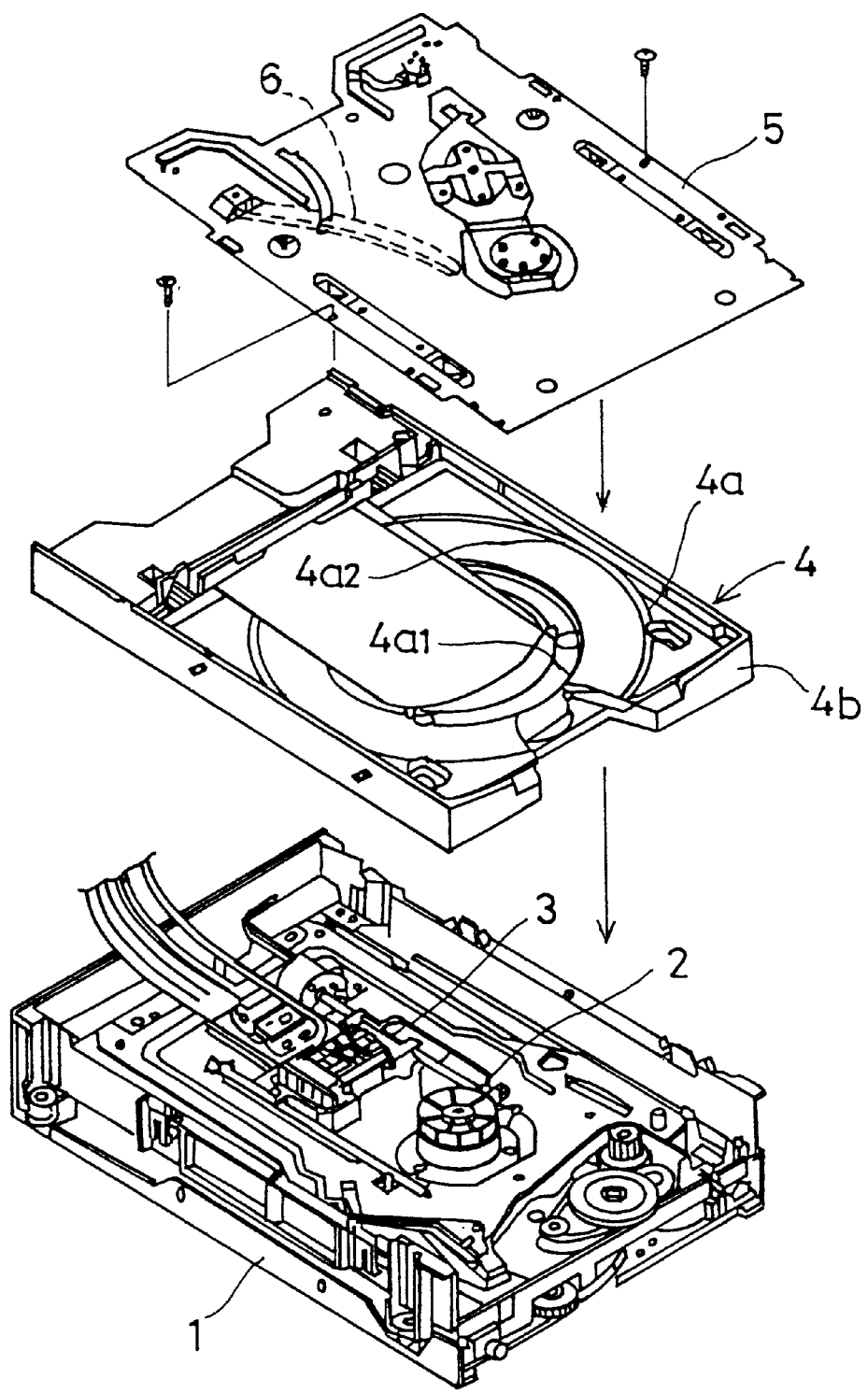
FIG. 25 is a perspective view of a conventional disk apparatus in which either a CD-ROM or a disk cartridge can be held on a disk tray at a loaded position.

In the conventional disk apparatus of FIG. 25, the support plate 5 is provided on the disk tray 4, and the upper area located above the chassis 1 is enclosed by the support plate 5. As described above, the shutter lever 6 is provided on the bottom surface of the support plate 5, and the shutter lever 6 serves to open the shutter in the disk cartridge when the cartridge is inserted in the tray 4 and the tray 4 is moved from the disk-change position to the disk-loaded position. In the conventional disk apparatus of FIG. 25, after the shutter lever 6 passes over the turntable 2 during the rearward movement of the tray 4, the shutter in the cartridge is fully opened by the shutter lever 6. Therefore, a height of the tray 4 in the conventional disk apparatus at which the shutter in the cartridge is opened by the shutter lever 6, must be higher than the turntable so as to avoid interference of the shutter lever 6 with the turntable 2 during the rearward movement of the tray.

However, in the disk apparatus 11 of the present embodiment, before the shutter 45c passes over the turntable 24 during the rearward movement of the tray 12, the shutter 45c in the cartridge 45 is fully opened by the connecting roller 34 on the tray 12. The height of the tray 12 at which the cartridge 45 is inserted can be lowered to a position at which the disk 43 in the cartridge 45 is not brought into contact with the turntable 24. The disk apparatus 11 of the present embodiment is effective in providing a thin structure for an optical disk drive housed in a notebook-size computer.

Further, in the disk apparatus 11 of the present embodiment, the cartridge 45 on the tray 12 passes beneath the clamper 44 during the rearward movement of the tray 12 while the shutter 45c in the cartridge 45 is fully opened. This makes it possible to locate the clamper 44 on the top plate 22a of the chassis 22 at a height lower than the top of the shutter 45c of the cartridge 45. The disk apparatus 11 of the present embodiment is effective in providing a small-height structure for an optical disk drive housed in a notebook-size computer.

In addition, the support plate 5 for supporting the shutter lever 6 as in the conventional disk apparatus of FIG. 25 is not required by the disk apparatus 11 of the present embodiment. Thus, the disk apparatus 11 of the present embodiment is effective in providing a small-height structure for an optical disk drive housed in a notebook-size computer.

When taking the cartridge 45 out of the tray 12 after the cartridge 45 is held on the tray 12, the operator presses the eject button 17 on the front bezel 16. When the eject button 17 is pressed, the lock lever 18 on the back side of the tray 12 is disconnected from the connecting pin 19 on the chassis 22, so that the tray locking unit 13 unlocks the tray 12. As the tray 12 is unlocked, the pressing lever 20 in the tray pressing unit 14 pushes the rear end wall 23 of the chassis 22 due to the actuating force of the spring 21 so that the tray 12 is moved relative to the chassis 22 in the direction A by the pressing lever 20. This allows the operator to easily pull the tray 12 out of the chassis 22 and move the tray 12 to the disk-change position.

As the tray 12 is moved relative to the chassis 22 in the direction A after the eject button 17 is pressed, the cartridge 45 on the tray 12 passes over the turntable 24. After the cartridge 45 passes over the turntable 24, the shutter 45c in the cartridge 45 is shut by the shutter open/close unit 15 in accordance with a procedure reverse to the above-described shutter opening procedure.

In the above-described embodiment, the positions where the rack 61 and the rack locking plate 63 are installed on the chassis 22 are overlapped by a path of the disk supporting member 30a on the tray 12 passing over the chassis 22 during the rearward movement of the tray 12. The bearing portion 12d in which the disk supporting member 30a is rotatably supported extends downwardly from the bottom of the tray 12. Therefore, it is conceivable that interference of the bearing portion 12d with the rack 61 and the rack locking plate 63 during the rearward movement of the tray 12 may be avoided by setting the height of the tray 12 in the disk apparatus 11 at a raised position.

However, the setting of the height of the tray 12 in the above-mentioned manner contradicts the need for a thin structure for an optical disk drive in a notebook-size personal computer. To resolve this problem, in the above-described embodiment, after a rib 12e (shown in FIG. 12) on the bottom of the tray 12 moves the rack locking plate 63 to the unlocking position, the rack 61 is rotated to a disconnected position such that the bearing portion 12d does not interfere with the rack 61 and the rack locking plate 63 during the rearward movement of the tray 12.

Next, a description will be given of an operation of the shutter open/close unit 15 in the disk apparatus 11 of the present embodiment to respectively move the rack locking plate 63 and the rack 61 to the unlocking position and the disconnected position.

Figure 12:
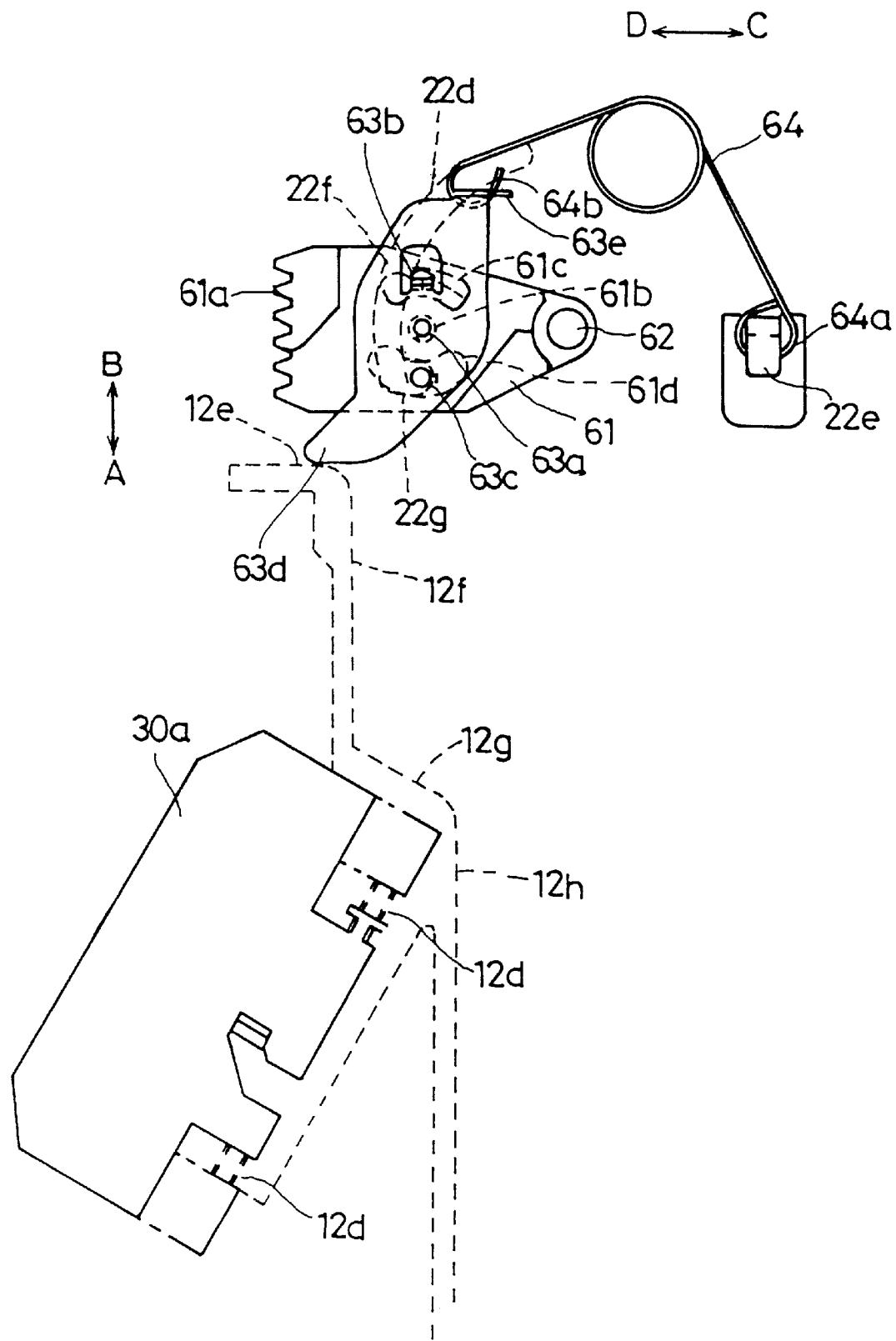
FIG. 12 is a diagram for explaining a condition of the shutter open/close unit before a rack locking plate is moved to an unlocking position.
Figure 13:
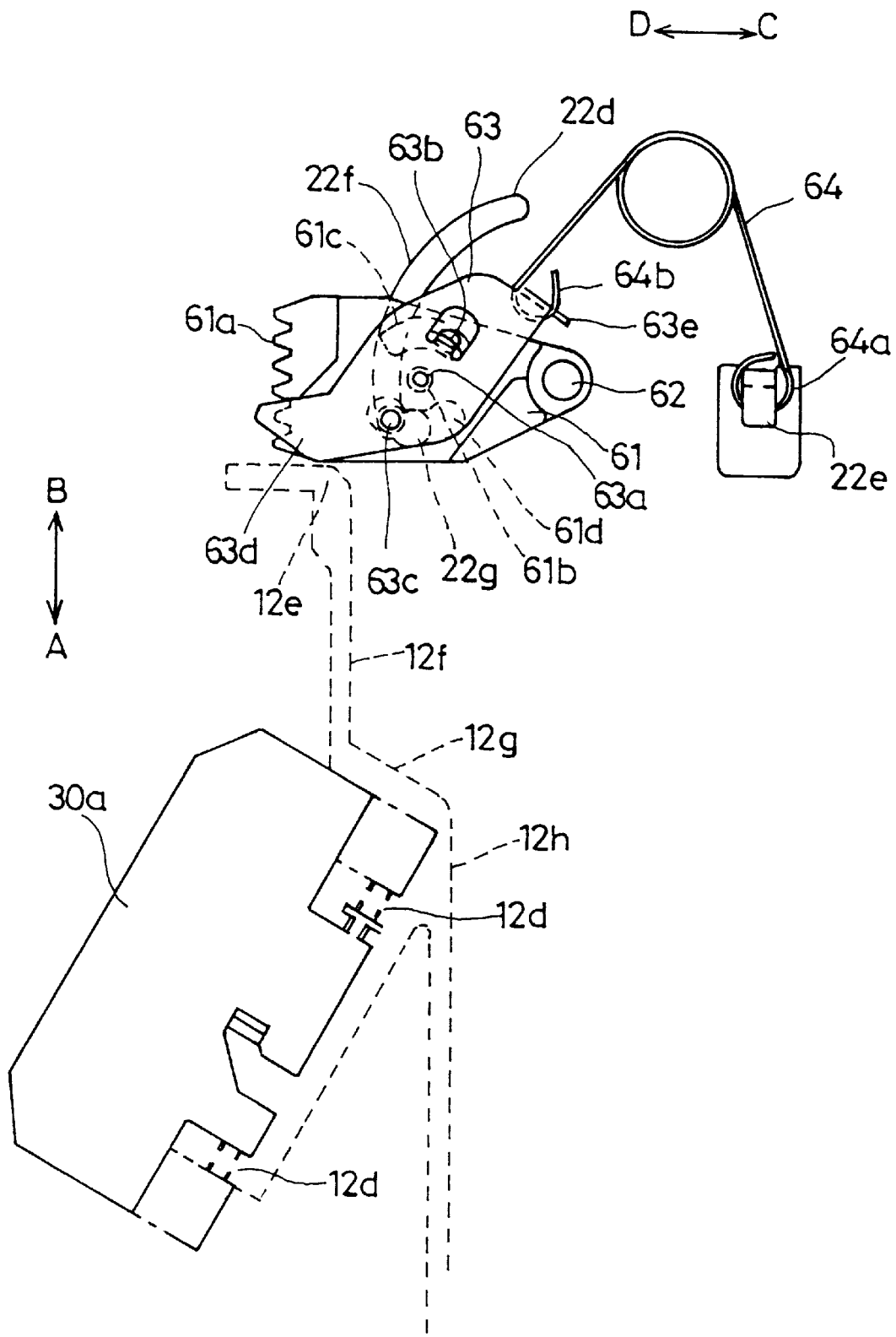
FIG. 13 is a diagram for explaining a condition of the shutter open/close unit when the rack locking plate starts being moved to the unlocking position.
Figure 14:
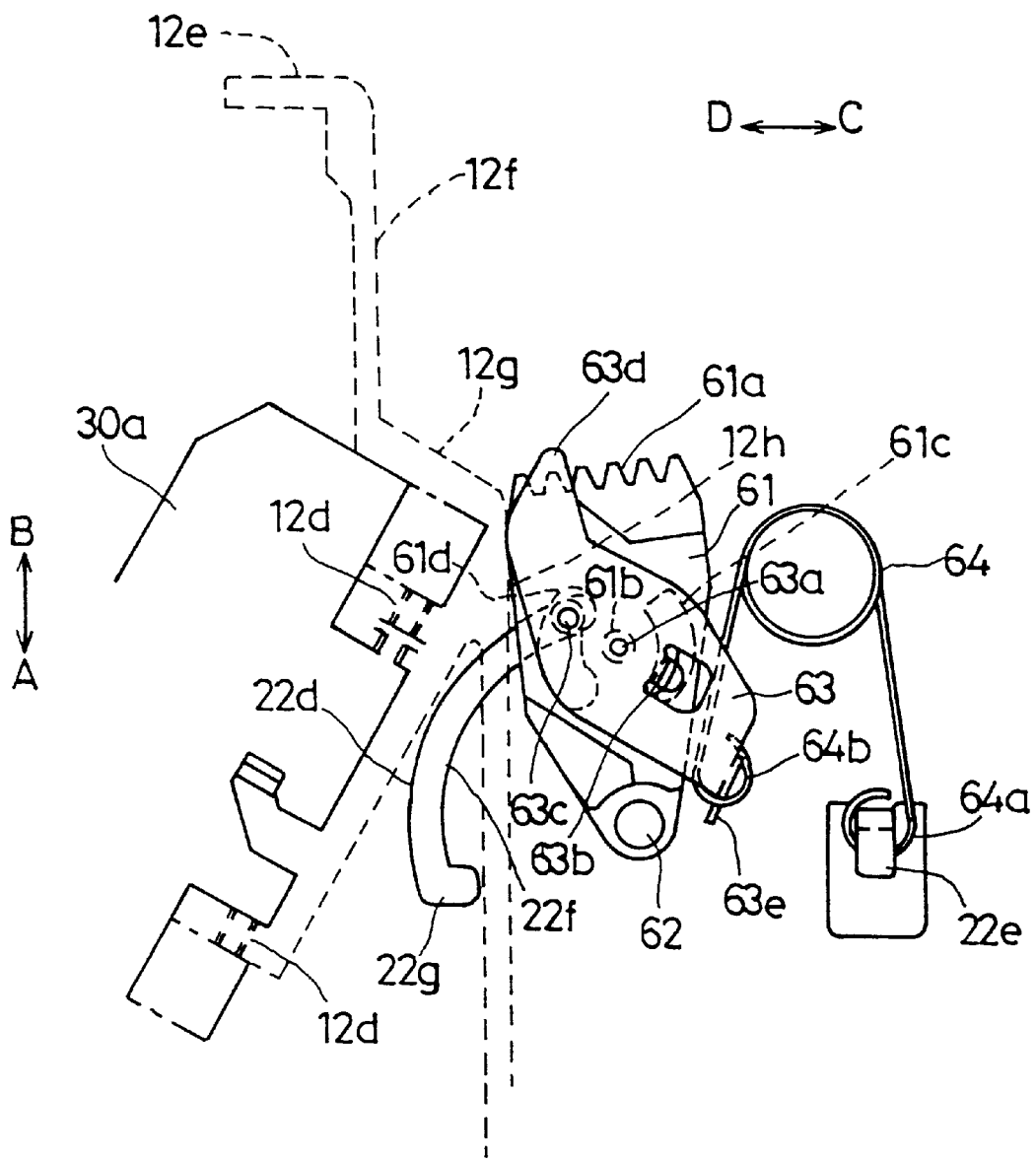
FIG. 14 is a diagram for explaining a condition of the shutter open/close unit when the rack locking plate is at the unlocking position.

FIG. 12 shows a condition of the shutter open/close unit 15 before the rack locking plate 63 is moved to the unlocking position. FIG. 13 shows a condition of the shutter open/close unit 15 when the rack locking plate 63 starts being moved to the unlocking position. FIG. 14 shows a condition of the shutter open/close unit 15 when the rack locking plate 63 is at the unlocking position.

As shown in FIG. 12, during the movement of the tray 12 to the disk-loaded position in the direction B, the rib 12e downwardly extending from the bottom of the tray 12 is brought into contact with a contact portion 63d of the rack locking plate 63.

When the tray 12 is further moved in the direction B, as shown in FIG. 13, the rack locking plate 63 starts being moved to the unlocking position by the rib 12e. The rack locking plate 63 includes a shaft 63a, a first connecting portion 63b and a second connecting portion 63c. The rack 61 includes a toothed portion 61a, a shaft hole 61b, a first recess 61c and a second recess 61d. The first recess 61c and the second recess 61d have a circular configuration provided around the shaft hole 61b. The shaft 63a of the racking locking plate 63 is connected to the shaft hole 61b of the rack 61. The first connecting portion 63b is connected to the first recess 61c. The second connecting portion 63c is connected to the second recess 61d. Thus, when the contact portion 63d is pressed in the direction B by the rib 12e, the rack locking plate 63 is rotated clockwise around the shaft 63a.

The chassis 22 includes a cam groove 22d provided in the base 22b, and the cam groove 22d includes a circular portion 22f and a lock portion 22g. When the rack locking plate 63 starts being moved to the unlocking position, the second connecting portion 63c downwardly extending from the rack locking plate 63 is disconnected from the lock portion 22g of the cam groove 22d and connected to the circular portion 22f. This allows the rack locking plate 63 to be unlocked from the base 22b of the chassis 22. The rack locking plate 63 at this time is rotatable around the shaft 63a in accordance with the connection of the second connecting portion 63c to the circular portion 22f of the cam groove 22d.

The helical torsion spring 64 exerts the actuating force on the rack locking plate 63 such that the rack locking plate 63 is rotated clockwise around the shaft 63a by the spring 64. The contact portion 63d of the rack locking plate 63 is easily moved in the direction B by the rib 12e of the tray 12 with the help of the actuating force of the spring 64.

When the tray 12 is further moved in the direction B, as shown in FIG. 14, the rack locking plate 63 is rotated clockwise together with the rack 61 by the rib 12e, and the contact portion 63d and the rack 61 are set at the disconnected position. As the first and second connecting portions 63b and 63c are connected to the first and second recesses 61c and 61d, the rack 61 is moved to the disconnected position in accordance with the rotation of the rack locking plate 63 around the shaft 63a.

Accordingly, the rack locking plate 63 is moved to the unlocking position by the rib 12e of the tray 12, and the rack 61 is moved to the disconnected position by the connection of the first and second connecting portions 63b and 63c and the first and second recesses 61c and 61d. As indicated by a dotted line in FIGS. 12–14, the bottom of the tray 12 includes a parallel rib 12f extending from the rib 12e in the direction A, a slanted rib 12g extending from the rib 12f, and a parallel rib 12h extending from the slanted rib 12g in the direction A. The bearing portions 12d on the bottom of the tray 12 are encircled by the ribs 12f–12h. When the tray 12 is moved in the direction B, the contact portion 63d slides on these ribs 12f–12h, and the rack locking plate 63 is rotated clockwise around the shaft 63a.

As the rack locking plate 63 is at the unlocking position and the rack 61 is at the disconnected position, the bearing portion 12d downwardly extending from the bottom of the tray 12 does not interfere with the rack 61 and the rack locking plate 63 during the rearward movement of the tray 12. In the above-described embodiment, it is not necessary to set the height of the tray 12 in the disk apparatus 12 at a raised position in order to avoid interference of the bearing portions 12d with the rack 61 and the rack locking plate 63. Therefore, the disk apparatus 11 of the present embodiment is effective in providing a small-height structure for an optical disk drive housed in a notebook-size personal computer.

Next, a description will be given of an operation of the movable base lifting unit 70 in the disk apparatus 11 of the present embodiment.

Figure 15:
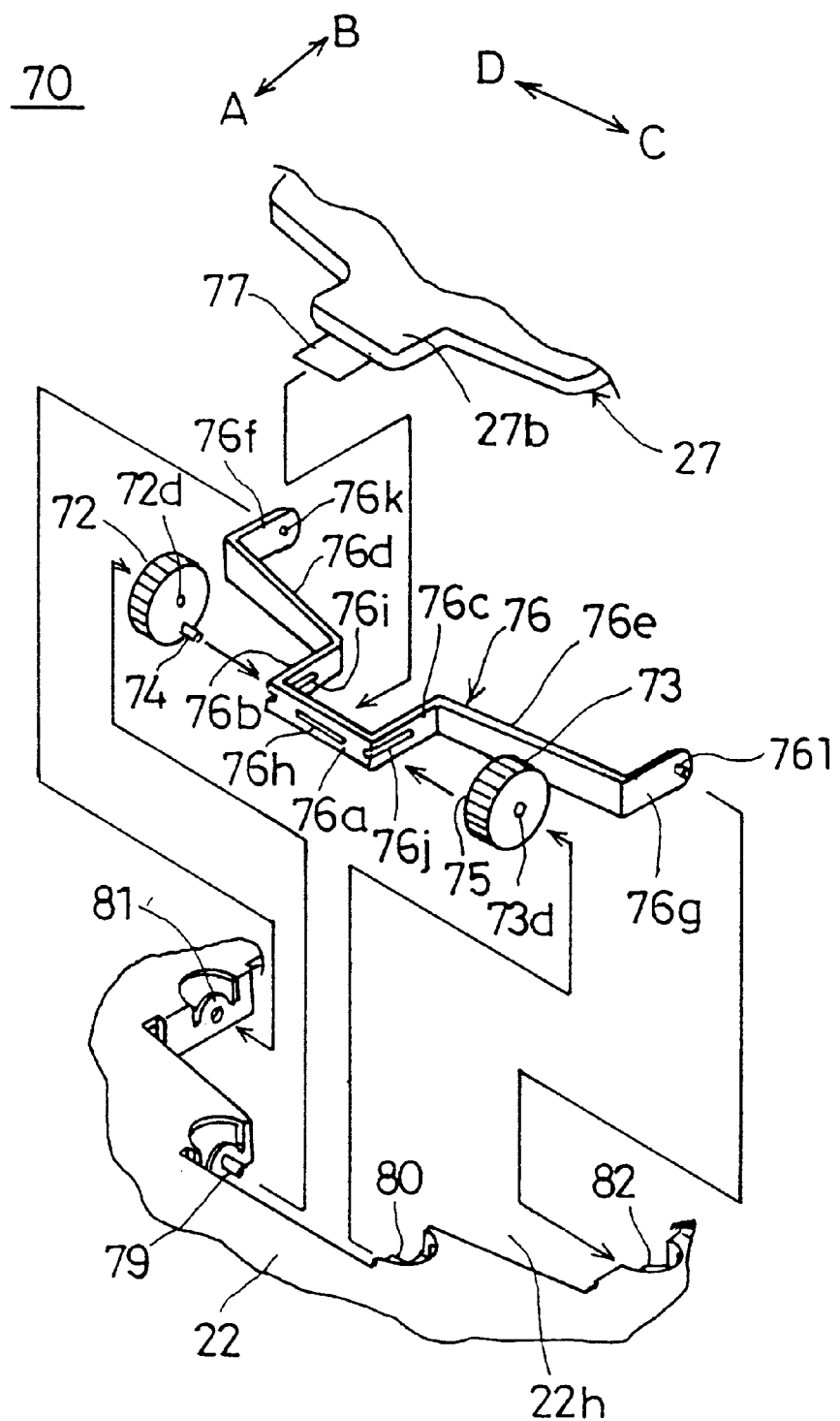
FIG. 15 is an exploded view of a movable base lifting unit in the disk apparatus.
Figure 16:
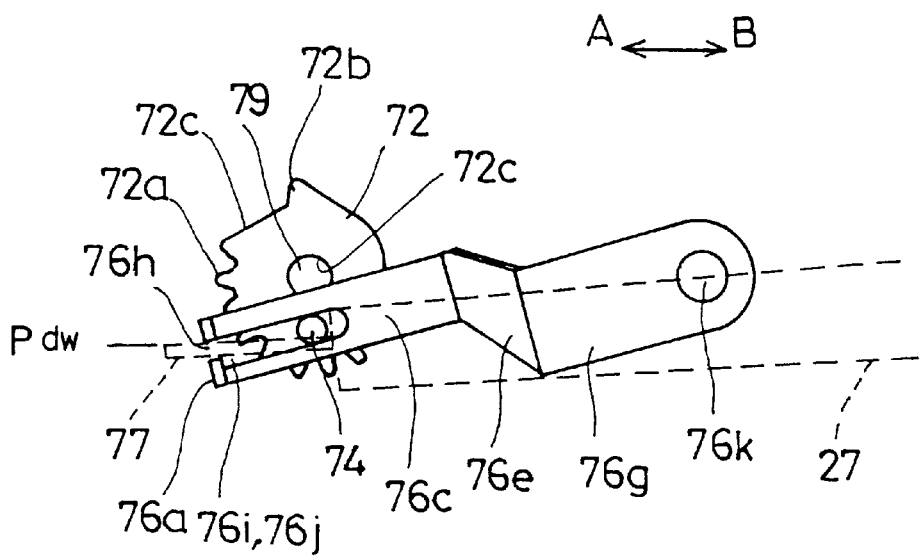
FIG. 16 is a diagram for explaining a condition of the movable base lifting unit when the tray is pulled open.

FIG. 15 shows a configuration of the movable base lifting unit 70. FIG. 16 shows a condition of the movable base lifting unit 70 when the tray 12 is pulled open.

As shown in FIG. 1 and FIG. 15, the movable base lifting unit 70 comprises a pair of racks 71 on the bottom of the tray 12, a pair of pinions 72 and 73 engaged with the racks 71, a pair of off-center pins 74 and 75 inwardly extending from the pinions 72 and 73, a connecting lever 76 connected to the off-center pins 74 and 75, and a leaf spring 77 connected to the connecting lever 76. The off-center pin 74 extends from an off-center position of the pinion 72 in the direction C, and the off-center pin 75 extends from an off-center position of the pinion 73. The leaf spring 77 is fixed at one end to a front end portion 27b of the movable base 27, and connected at the other end to the connecting lever 76.

The pinions 72 and 73, the off-center pins 74 and 75, the connecting lever 67 and the leaf spring 77, included in the movable base lifting unit 70, are provided in front of the front end portion 27b of the movable base 27 as shown in FIG. 1, not beneath the movable base 27. In the disk apparatus 11, it is not necessary to provide an additional space beneath the movable base 27 for installing the movable base lifting unit 70. The disk apparatus 11 of the present embodiment is effective in providing a small-height structure for an optical disk drive housed in a notebook-size personal computer.

As indicated by a dotted line in FIG. 1, the racks 71 are provided in front of the opening 29 in the tray 12. A raised portion 78 (shown in FIG. 17) is provided on the bottom of the tray 12 at the end of each of the racks 71. A recessed portion 71a is provided between the raised portion 78 and each of the racks 71.

The pinion 72 comprises a toothed portion 72a engaged with one of the racks 71, a contact portion 72b brought in contact with one of the raised portions 78, and a recessed portion 72c provided between the toothed portion 72a and the contact portion 72b. Similarly, the pinion 73 comprises a toothed portion 73a engaged with one of the racks 71, a contact portion 73b brought in contact with one of the raised portions 78, and a recessed portion 73c provided between the toothed portion 73a and the contact portion 73b. The contact portions 72b and 73b are brought into contact with the raised portions 78 during the rearward movement of the tray 12. The pinions 72 and 73 are rotated by the engagement of the contact portions 72b and 73b and the raised portions 78. The contact portions 72b and 73b serve to match the timing of engagement of the pinions 72 and 73 and the racks 71 with the timing of the tray 12 being moved to the disk-loaded position.

The toothed portions 72a and 73a are partially provided on the periphery of the pinions 72 and 73, and the recessed portions 72c and 73c are provided between the toothed portion 72a and the contact portion 72b and between the toothed portion 73a and the contact portion 73b. The pinions 72 and 73 are engaged with the racks 71 for only a part of the entire stroke of the tray 12 being moved between the disk-change position and the disk-loaded position. This makes it possible to prevent erroneous engagement of the toothed portions 72a and 73a with the racks 71 at the beginning of contact of the pinions 72 and 73 and the racks 71.

If the rotation of the pinions 72 and 72 starts at the beginning of contact of the pinions 72 and 73 and the racks 71, the movable base 27 may be lifted by the movable base lifting unit 70 before the shutter 45c in the cartridge 45 is fully opened or before the tray 12 is set at the disk-loaded position. In the present embodiment, the recessed portions 72c and 73c are provided between the toothed portion 72a and the contact portion 72b and between the toothed portion 73a and the contact portion 73b in order to avoid the start of rotation of the pinions 72 and 73 at the beginning of contact with the racks 71. It is possible for the movable base lifting unit 70 of the present embodiment to match the timing of engagement of the pinions 72 and 73 and the racks 71 with the timing of the tray 12 being moved to the disk-loaded position.

In the above-described embodiment, the engagement of the toothed portions 72a and 73a with the racks 71 is performed at an appropriate timing by bringing the contact portions 72b and 73b into contact with the raised portions 78. It is possible to prevent the operation of the movable base lifting unit 70 to lift the movable base 27 from being retarded or advanced. In addition, it is possible to start the lifting operation of the movable base lifting unit 70 after the shutter 45c in the cartridge 45 is fully opened in response to the movement of the tray 12.

When the tray 12 is moved in the direction B from the disk-change position to the disk-loaded position, the movable base lifting unit 70 lifts the movable base 27 to a raised position "Pup" after the shutter 45c in the cartridge 45 is fully opened in response to the movement of the tray 12. When the tray 12 is moved in the direction A from the disk-loaded position to the disk-change position, the movable base 27 is moved down before the shutter 45c in the cartridge 45 is shut in response to the movement of the tray 12.

The off-center pins 74 and 75 are moved from lowermost positions to uppermost positions by the rotation of the pinions 72 and 73. When the front end portion 27b of the movable base 27 is moved down to a lowered position "Pdw", the off-center pins 74 and 75 are at the lowermost positions in the pinions 72 and 73. When the front end portion 27b of the movable base 27 is lifted to the raised position "Pup" (or the read/write position), the off-center pins 74 and 75 are at the uppermost positions in the pinions 72 and 73.

As shown in FIG. 15, the connecting lever 76 comprises a laterally extending center portion 76a provided between the pinion 72 and the pinion 73, a connecting portion 76b extending in the direction B from one end of the center portion 76a, a connecting portion 76c extending in the direction B from the other end of the center portion 76a, an arm portion 76d extending in the direction D from the connecting portion 76b, an arm portion 76e extending in the direction C from the connecting portion 76c, a support portion 76f extending in the direction B from the arm portion 76d, and a support portion 76g extending in the direction B from the arm portion 76e.

A slit 76h is provided in the middle of the center portion 76a, and the leaf spring 77 is inserted in the slit 76h such that the front end portion 27b of the movable base 27 is rotatably supported on the center portion 76a of the connecting lever 76. When the center portion 76a of the connecting lever 76 is lifted or lowered, the front end portion 27b of the movable base 27 is vertically moved by the leaf spring 77 together with the connecting lever 76. The leaf spring 77 is elastically deformable only in the vertical directions. When the center portion 76a is lifted or lowered by the rotation of the pinions 72 and 73, the movable base 27 is vertically moved through the elastic deformation of the leaf spring 77. The leaf spring 77 serves to absorb shock of the movable base 27 when the movable base 27 is lifted or lowered.

When the front end portion 27b of the movable base 27 is lifted, the movable base 27 is brought into contact with the contact portions 99 on the base 22b of the chassis 22, so that the disk 43 or the cartridge 45 on the turntable 24 in the movable base 27 is positioned at the read/write position. The off-center pins 74 and 75 at this time are at the uppermost positions in the pinions 72 and 73, and the center portion 76a is lifted. The leaf spring 77 elastically deforms, and the movable base 27 is pressed to the contact portions 99 due to an actuating force of the leaf spring 77 when the disk 43 or the cartridge 45 is positioned at the read/write position.

A slit 76i and a slit 76j are provided in the front half of the connecting portion 76b and the front half of the connecting portion 76c. The off-center pin 74 of the pinion 72 is fitted in the slit 76i, and the off-center pin 75 of the pinion 73 is fitted in the slit 76j. The slits 76i and 76j are a long, narrow opening extending in the directions A and B to allow the rotation of the off-center pins 74 and 75.

As shown in FIG. 15, the chassis 22 has a recess 22h provided in the chassis 22 in front of the front end portion 27b of the movable base 27. A shaft 79 and a shift 80 are provided in the recess 22h of the chassis 22, and the shafts 79 and 80 extend in the directions C and D. The shaft 79 and the shaft 80 are fitted into a shaft hole 72d of the pinion 72 and a shaft hole 73d of the pinion 73, respectively. The pinions 72 and 73 are arranged within the recess 22h of the chassis 22. The pinions 72 and 73 partially extend upward from the chassis 22 while the pinions 72 and 73 are rotatably supported by the shafts 79 and 80.

The chassis 22 has a pair of bearing portions 81 and 82 provided in the recess 22h. A laterally extending shaft 76k is provided at the rear end of the support portion 76f of the connecting lever 76, and a laterally extending shaft 76l is provided at the rear end of the support portion 76g of the connecting lever 76. The shafts 76k and 76l are fitted in the bearing portions 81 and 82 such that the connecting lever 76 is rotatably supported on the chassis 22. Thus, the center portion 76a of the connecting lever 76 is vertically rotated around the shafts 76k and 76l when the off-center pins 74 and 75 are rotated together with the rotation of the pinions 72 and 73.

Figure 17:
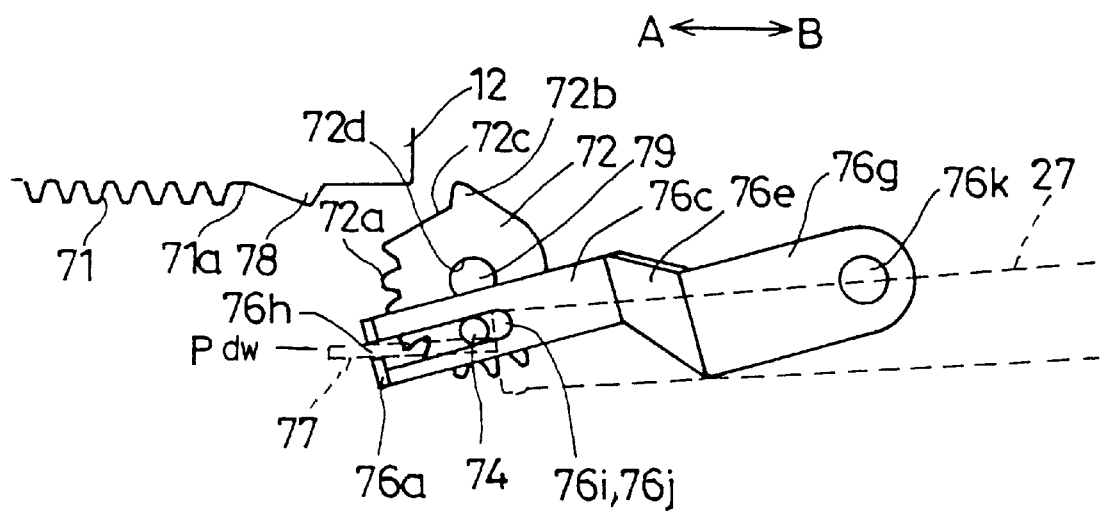
FIG. 17 is a diagram for explaining a condition of the movable base lifting unit during movement of the tray.
Figure 18:
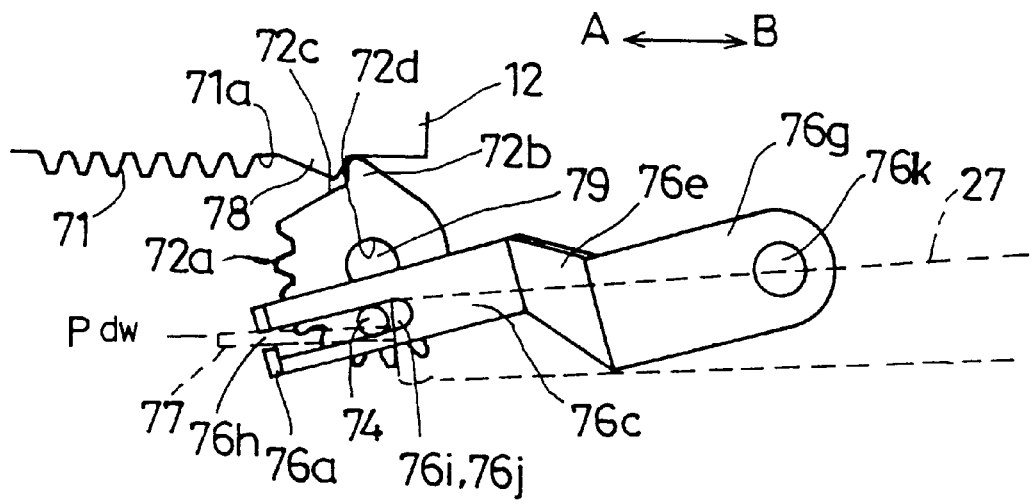
FIG. 18 is a diagram for explaining a condition of the movable base lifting unit during movement of the tray.
Figure 19:
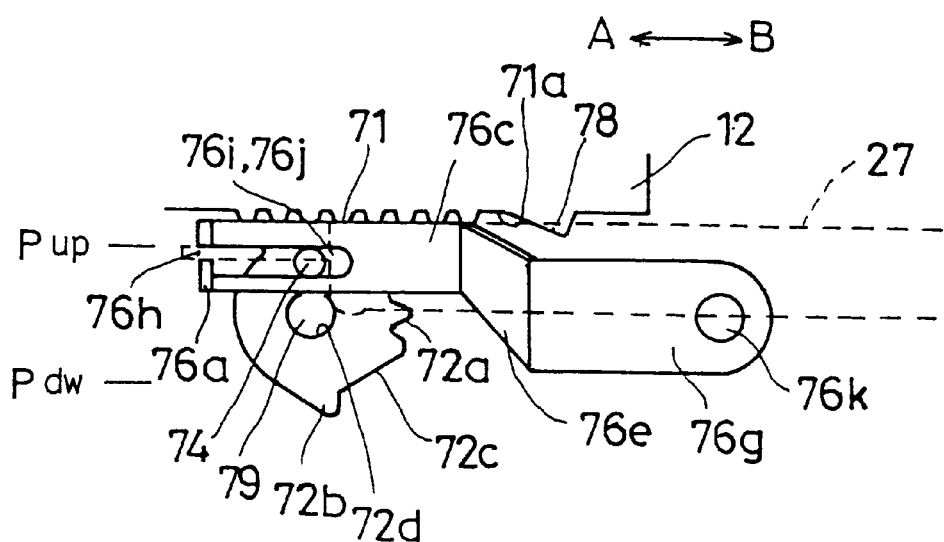
FIG. 19 is a diagram for explaining a condition of the movable base lifting unit when the tray is set at the disk-loaded position.

FIG. 17 shows a condition of the movable base lifting unit 70 during movement of the tray 12. FIG. 18 shows another condition of the movable base lifting unit 70 during movement of the tray 12. FIG. 19 shows a condition of the movable base lifting unit 70 when the tray 12 is set at the disk-loaded position.

When the tray 12 is pulled open at the disk-change position, as shown in FIG. 1, the front end portion 27b of the movable base 27 is moved down to the lowered position "Pdw". The pinions 72 and 73 are not engaged with the racks 71 on the bottom of the tray 12. If the cartridge 45 is inserted in the tray 12, the tray 12 is moved in the direction B. The racks 71 on the bottom of the tray 12 approach the pinions 72 and 73, as shown in FIG. 17. At the same time, the shutter 45c in the cartridge 45 is moved in the opening direction C by the shutter arm 31.

When the tray 12 is further moved in the direction B, the raised portions 78 on the bottom of the tray 12 are brought into contact with the contact portions 72b and 73b of the pinions 72 and 73, as shown in FIG. 17. At this time, the pinions 72 and 73 are not rotated and the front end portion 27b of the movable base 27 is at the lowered position "Pdw" while the tray 12 is moving in the direction B.

When the tray 12 is further moved in the direction B after the contact of the raised portions 78 and the contact portions 72b and 73b, as shown in FIG. 18, the pinions 72 and 73 are rotated clockwise by the raised portions 78 on the bottom of the tray 12. The off-center pins 74 and 75 extending sideways from the vertical inside surfaces of the pinions 72 and 73 are moved upward from the lowermost positions by the rotation of the pinions 72 and 73 in response to the movement of the tray 12.

As the off-center pins 74 and 75 are moved upward, the connecting lever 76 is rotated upward around the shafts 76k and 76l by the connection of the pins 74 and 75 and the connecting portions 76b and 76c. The center portion 76a of the connecting lever 76 is connected to the front end portion 27b of the movable base 27 via the leaf spring 77. Thus, the movable base 27 is rotated upward around the shaft 27a by the connection of the center portion 76a and the front end portion 27b.

When the off-center pins 74 and 75 are at the uppermost positions in the pinions 72 and 73, as shown in FIG. 19, the front end portion 27b of the movable base 27 is moved up to the raised position "Pup". At this time, the disk 43 or the cartridge 45 on the turntable 24 in the movable base 27 is clamped between the clamper 44 and the turntable 24, as shown in FIG. 4. The lock lever 18 is connected to the connecting pin 19 on the chassis 22 so that the tray 12 is locked by the tray locking unit 13. As the racks 71 on the bottom of the tray 12 are engaged with the pinions 72 and 73, the disk 43 or the cartridge 45 on the turntable 24 in the movable base 27 is locked at the read/write position (or the raised position).

In the above-described movable base lifting unit 70, the rotation of the pinions 72 and 73 responsive to the movement of the tray 12 enables the movable base 27 to be lifted to the raised position "Pup", and the disk 43 or the cartridge 45 on the turntable 24 in the movable base 27 is held at the read/write position by the movable base lifting unit 70. The movable base lifting unit 70 has no element or portion which is subjected to a considerable degree of mechanical friction, and it is possible to smoothly move up and down the movable base 27 to the raised position by applying a small force. In addition, only a small amount of mechanical wear is produced therein, and the movable base 27 can be moved up and down without causing a problem even if the movement of the tray 12 for the disk change is frequently performed. It is possible to provide increased durability to the disk apparatus 11 of the present embodiment.

In the above-described movable base lifting unit 70, when taking the cartridge 45 out of the tray 12 after the tray 12 with the cartridge 45 held thereon is set at the disk-loaded position, the operator presses the eject button 17 on the front bezel 16. The lock lever 18 is disconnected from the connecting pin 19 by the movement of the eject button 17, and the tray locking unit 13 unlocks the tray 12. The pressing lever 20 in the tray pressing unit 14 pushes the rear end wall 23 of the chassis 22 due to the actuating force of the spring 21, and the tray 12 is moved in the direction A relative to the chassis 22 by the pressing lever 20.

As the tray 12 is moved in the direction A from the position shown in FIG. 19, the pinions 72 and 73 in the movable base lifting unit 70 are, at the same time, rotated counterclockwise to the position shown in FIG. 18. The front end portion 27b of the movable base 27 is moved down to the lowered position "Pdw" by the rotation of the pinions 72 and 73. After the front end portion 27b of the movable base 27 is lowered, the operator can easily pull the tray 12 out of the chassis 22 and moves the disk tray 12 to the disk-change position, as shown in FIG. 1.

After the cartridge 45 on the tray 12 passes over the turntable 24 in the movable base 27 in response to the forward movement of the tray 12, the shutter 45c in the cartridge 45 is shut by the shutter open/close unit 15 in accordance with the procedure reverse to the shutter opening procedure.

In the above-described embodiment, the racks 41 on the bottom of the tray 12 are engaged with the pinions 72 and 73 on the chassis 22 so as to move up and down the movable base 27. The present invention is not limited to this embodiment, and variations and modifications may be made without departing from the present invention. Other parts than the racks 41, such as actuators, may be used to rotate the pinions 72 and 73 so as to move up and down the movable base 27.

The disk apparatus 11 of the above-described embodiment can be applied to not only the optical disk drive capable of holding one of a CD-ROM and a PD disk cartridge on a disk tray as in the above-described embodiment, but also a compact disk drive, a magnetic disk drive, a magneto-optical disk drive, and other optical disk drives.

Figure 20:
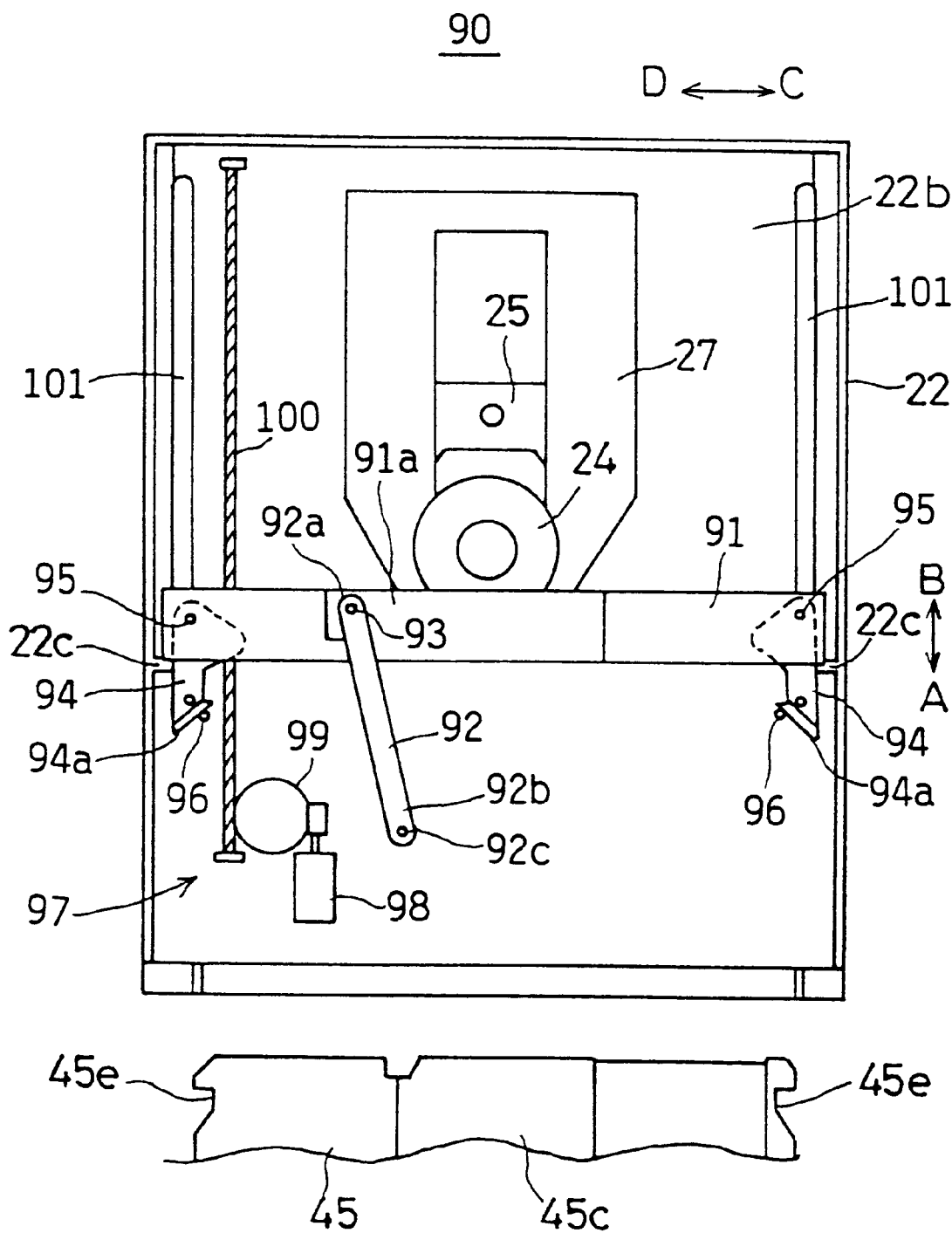
FIG. 20 is a top view of a second embodiment of the disk apparatus of the present invention in which the cartridge is not inserted.
Figure 21:
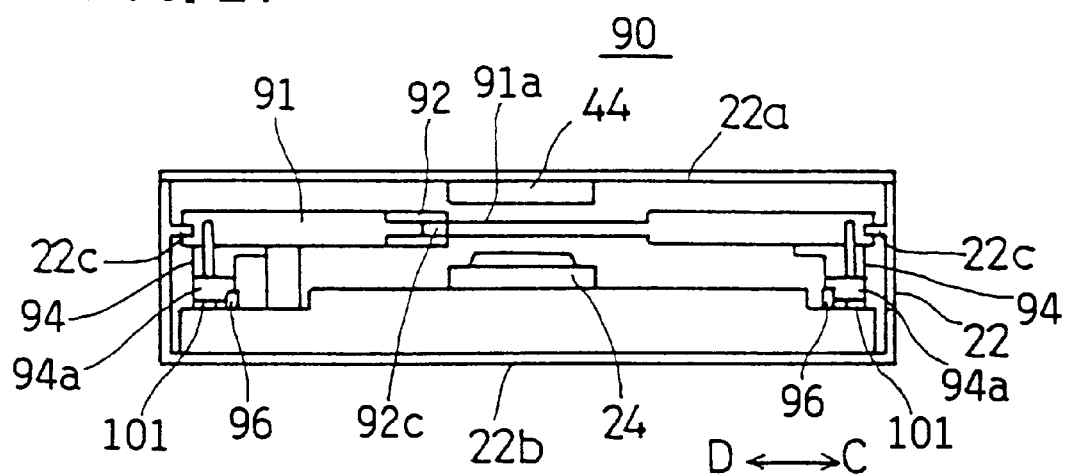
FIG. 21 is a front view of the disk apparatus of FIG. 20 in which the cartridge is not inserted.

Next, FIG. 20 shows a disk apparatus 90 in a second embodiment of the present invention. FIG. 21 is a front view of the disk apparatus 90 in which the cartridge 45 is not inserted.

In FIGS. 20 and 21, the elements which are the same as corresponding elements in FIGS. 1–4 are designated by the same reference numerals, and a description thereof will be omitted.

In the disk apparatus 90 of the present embodiment, a slide member 91 is provided in place of the disk tray 12 in the previously-described disk apparatus 11 of FIGS. 1–4. The slide member 91 latches the disk cartridge 45 when the disk cartridge 45 is inserted. The slide member 91 is movable relative to the chassis 22 in one of the inserting direction B and the ejecting direction A so as to move the cartridge 45 between a disk-change position and a disk-loaded position within the chassis 22. The slide member 91 extends laterally in the direction C (or D) perpendicular to the direction A (or B) with respect to the disk apparatus 90, and has a thickness nearly equal to the thickness of the cartridge 45. A shutter arm 92 is provided on the slide member 91 to open or shut the shutter 45c in the cartridge 45. The shutter arm 92 is rotatably supported at an intermediate portion of the slide member 91.

The slide member 91 includes a supporting part 91a in the middle of the slide member 91, and a shaft 93 is fitted into an end portion of the supporting part 91a. The shutter arm 92 has a first end 92a rotatably supported on the slide member 91 by the shaft 93 such that the shutter arm 92 is rotatable around the shaft 93. The shutter arm 92 has a second end 92b at which a connecting pin 92c is provided. The connecting pin 92c is connected to the shutter 45c in the cartridge 45 when the cartridge 45 is inserted. Further, a spring (not shown) is connected to the shutter arm 92, and the spring exerts an actuating force on the shutter arm 92 such that the shutter arm 92 is actuated so as to be rotated clockwise around the shaft 93 by the spring. Thus, before the cartridge 45 is inserted in the disk apparatus 90, the shutter arm 92 is actuated by the spring and the connecting part 92c extends from the slide member 91 in the direction A. The connecting part 92c of the shutter arm 92 at this time is set at a first position shown in FIG. 20. The connecting part 92c, which is set at the first position, is waiting for insertion of the cartridge 45 in the disk apparatus 90.

When the cartridge 45 is inserted in the disk apparatus 90, the shutter 45c in the cartridge 45 is connected by the connecting part 92c of the shutter arm 92, and then the cartridge 45 is brought into contact with the slide member 91. In the course of the movement of the cartridge 45 in the direction B, the shutter arm 92 is rotated counterclockwise around the shaft 93 by the cartridge 45, so that the shutter 45c in the cartridge 45 is opened by the connecting part 92c. After the shutter 45c in the cartridge 45 is opened, the cartridge 45 is brought into contact with the slide member 91.

The shutter arm 92 is made of an upper arm sheet and a lower arm sheet, and these arm sheets are attached together so as to place the supporting part 91a of the slide member 91 between the upper arm sheet and the lower arm sheet. The shutter arm 92 is rotated counterclockwise around the shaft 93 in response to the cartridge 45 when inserted, and the shutter arm 92 is moved to a second position shown in FIG. 22. When the shutter arm 92 is set at the second position shown in FIG. 22, the shutter arm 92 is joined onto the slide member 91 such that the position of the shutter arm 92 substantially accord with the position of the slide member 91. Since the shutter arm 92 is joined onto the slide member 91, it is not necessary to provide an additional space above the cartridge 45 for supporting the shutter arm 92 in the disk apparatus 90. The disk apparatus 90 of the present embodiment is effective in providing a thin structure for an optical disk drive housed in a notebook-size personal computer.

A pair of clamp members 94 are provided on the slide member 91 at both ends of the slide member 91. The clamp members 94 serve to be connected to side recesses 45e of the cartridge 45 when inserted. A pair of shafts 95 are embedded at the ends of the slide member 91, and the clamp members 94 are rotatably supported on the slide member 91 by the shafts 95, respectively. Each of the clamp members 94 has a connecting portion 94a at a leading edge of that clamp member 94. The connecting portions 94a of the clamp members 94 are connected to the side recesses 45e of the cartridge 45 when inserted. Further, a spring (not shown) is connected to each of the clamp members 94, and the spring exerts an actuating force on each clamp member 94 such that the clamp members 94 are actuated so as to be rotated inwardly by the springs. A pair of pins 96 are embedded on the base 22b of the chassis 22. Before the cartridge 45 is inserted in the disk apparatus 90, the connecting portions 94a of the clamp members 94 are connected to the pins 96, and the clamp members 94 are rotated outwardly against the actuating force of the springs as shown in FIG. 20.

When the cartridge 45 is inserted in the disk apparatus 90, the cartridge 45 is brought into contact with the slide member 91 and the slide member 91 is moved relative to the chassis 22 in the direction B. The connecting portions 94a of the clamp members 94 are disconnected from the pins 96 on the base 22b of the chassis 22 by the movement of the slide member 91. The clamp members 94 are actuated so as to be rotated inwardly due to the actuating force of the springs, and the connecting portions 94a are connected to the side recesses 45e of the cartridge 45 being inserted. Thus, the cartridge 45 is latched by the clamp members 94, and the cartridge 45 is movable together with the slide member 91 in the direction B to the disk-loaded position within the disk apparatus 90.

In the disk apparatus 90, a slide member drive unit 97 is provided to move the slide member 91 relative to the chassis 22 in one of the direction A and the direction B, so that the cartridge 45, latched by the clamp members 94 on the slide member 91, is moved between the disk-change position and the disk-loaded position.

The slide member drive unit 97 comprises a motor 98, a worm gear 99, a lead screw 100, and a pair of guide rails 101. The motor 98, the worm gear 98, the lead screw 100 and the guide rails 101 are provided on the base 22b of the chassis 22. The motor 98 is engaged with the lead screw 100 via the worm gear 99, and the lead screw 100 is rotated by a driving force of the motor 98 through the worm gear 99. The slide member 91 has a pair of leg portions extending downward from the bottom of the slide member 91 at the ends of the slide member 91, and the leg portions are movably supported on the guide rails 101 on the base 22b of the chassis 22. Thus, the slide member 91 is movable relative to the chassis 22 along the guide rails 101 in one of the direction A and the direction B.

The slide member 91 has a toothed portion extending downward from the bottom of the slide member 91, and the toothed portion is engaged with the lead screw 100. When the lead screw 100 is rotated by the motor 98 through the worm gear 99, the slide member 91 is moved to the chassis 22 along the guide rails 100 in one of the direction A and the direction B in response to the rotation of the lead screw 100. A pair of stoppers 22c upwardly projecting over the base 22b of the chassis 22 are provided on the inside walls of the chassis 22 at the ends of the guide rails 100, and the movement of the slide member 91 in the direction A beyond the ends of the guide rails 10 is inhibited by the stoppers 22c.

Figure 22:
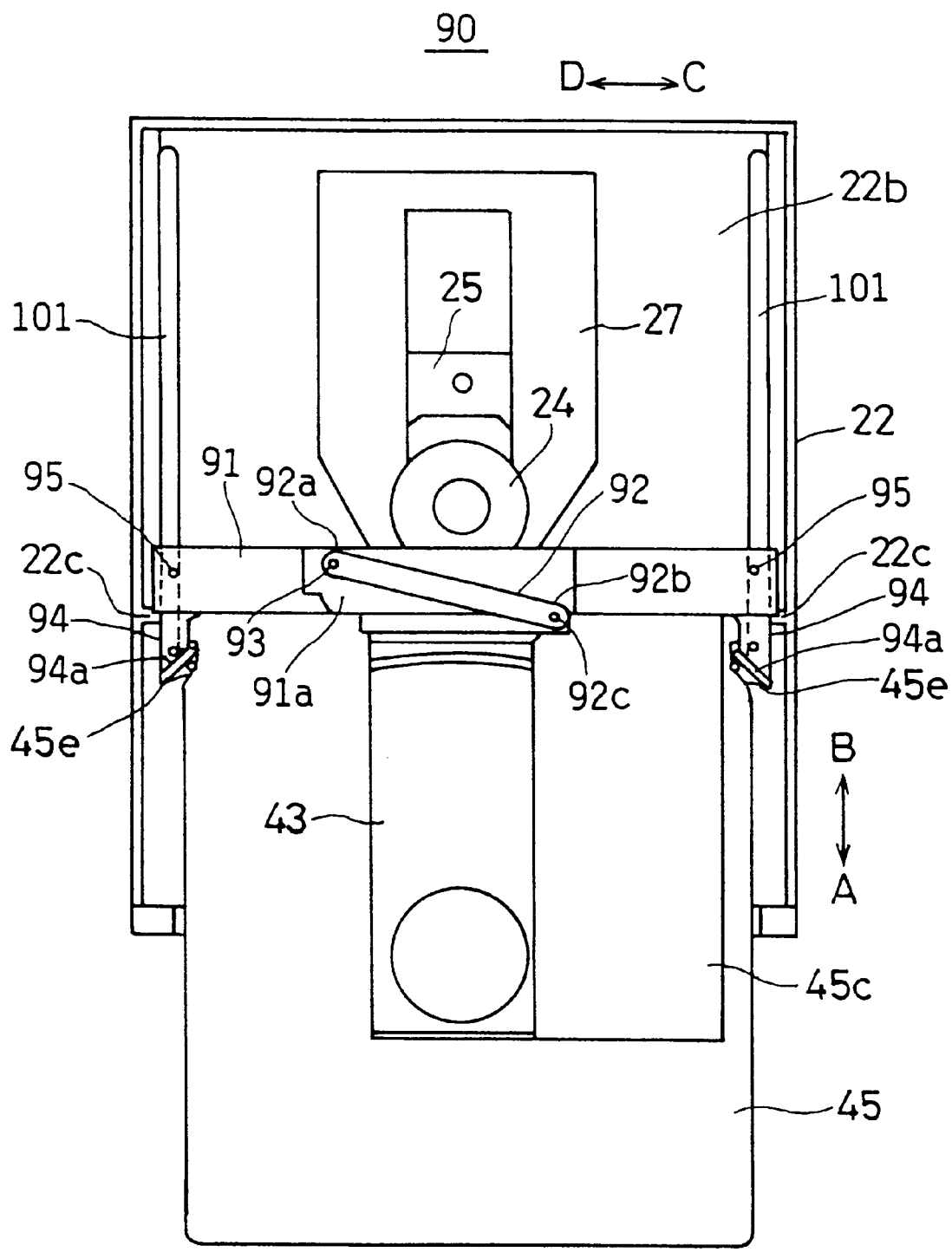
FIG. 22 is a diagram for explaining a condition of the disk apparatus of FIG. 20 in which the cartridge is inserted.
Figure 23:
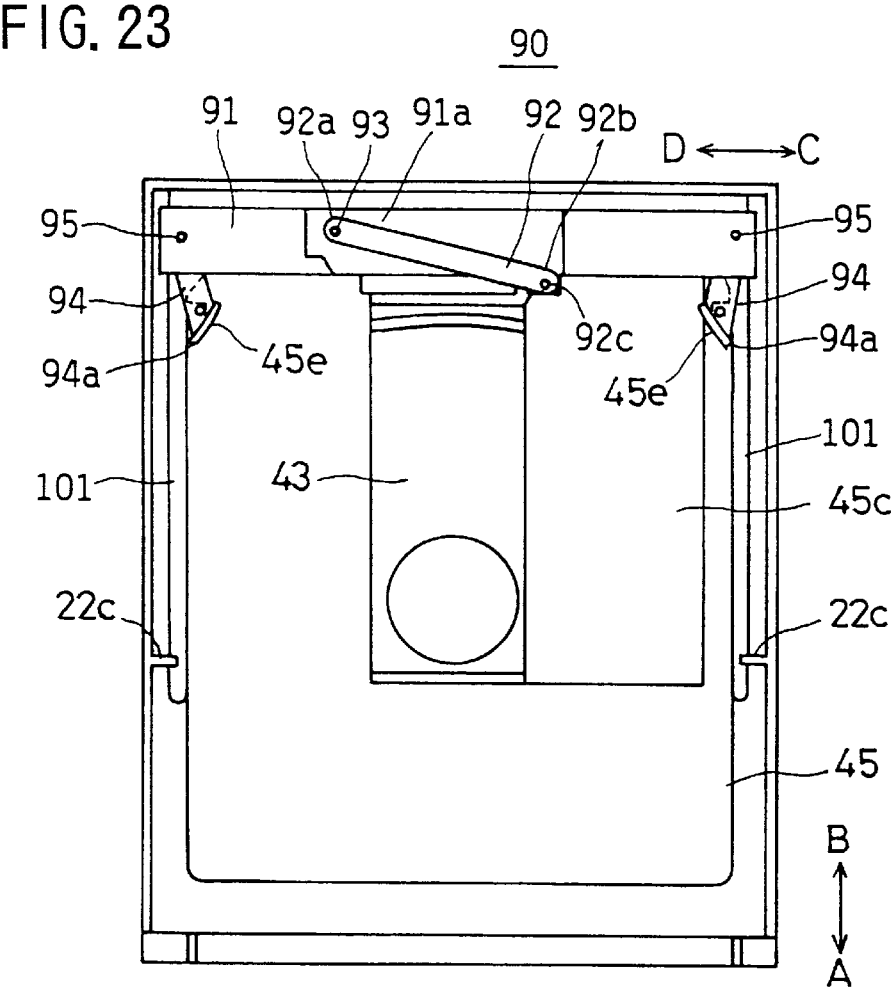
FIG. 23 is a diagram for explaining a condition of the disk apparatus of FIG. 20 in which the cartridge is set at a disk-loaded position.
Figure 24:
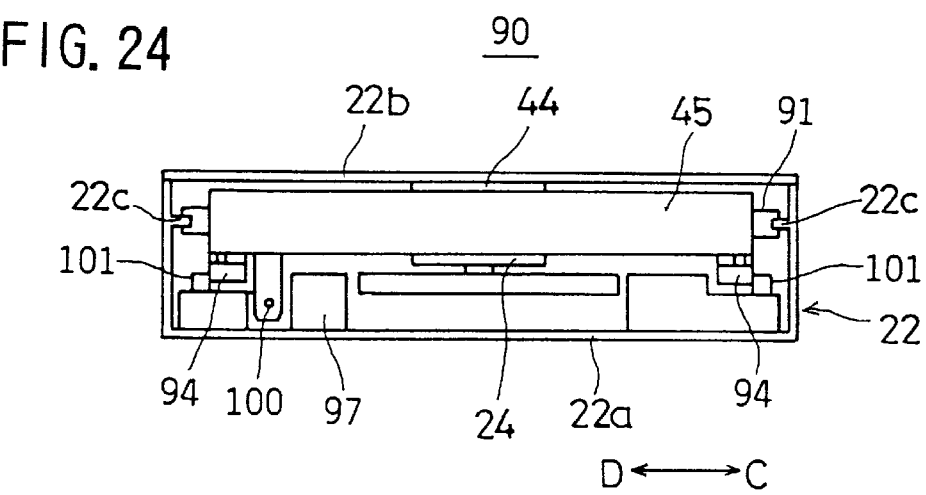
FIG. 24 is a front view of the disk apparatus of FIG. 23 in which the cartridge is set at the disk-loaded position.

FIG. 22 shows a condition of the disk apparatus 90 in which the cartridge 45 is inserted. FIG. 23 shows a condition of the disk apparatus 90 in which the cartridge 45 is set at the disk-loaded position. FIG. 24 is a front view of the disk apparatus 90 of FIG. 23 in which the cartridge 45 is set at the disk-loaded position.

As described above, when the cartridge 45 has been inserted in the disk apparatus 90, the shutter 45c is first connected to the connecting part 92c of the shutter arm 92. During the movement of the cartridge 45 in the inserting direction B, the shutter arm 92 is rotated counterclockwise around the shaft 93, so that the shutter 45c in the cartridge 45 is opened by the connecting part 92c. After this, the cartridge 45 with the shutter 45c being opened is brought into contact with the slide member 91.

When the cartridge 45 is further moved in the direction B by the operator, the slide member 91 is moved relative to the chassis 22 in the direction B by the cartridge 45. The connecting portions 94a of the clamp members 94 on the slide member 91 are disconnected from the pins 96 on the base 22b of the chassis 22. The connecting portions 94a are connected to the side recesses 45e of the cartridge 45 as shown in FIG. 22. At the same time, a motor switch (not shown) is turned ON.

As the motor switch is turned ON, the motor 98 starts rotation. The lead screw 100 is rotated by the motor 98 through the worm gear 99. The slide member 91 is further moved relative to the chassis 22 in the direction B in response to the rotation of the lead screw 100. The cartridge 45, latched by the clamp members 94, is moved relative to the chassis 22 in the direction B to the disk-loaded position within the disk apparatus 90 by the movement of the slide member 91.

When the cartridge 45 has reached the disk-loaded position within the disk apparatus 90, the rotation of the motor 98 is stopped. In the disk apparatus 90 of the present embodiment, the movable base lifting unit 70 (not shown in FIGS. 20–24) which is the same as the corresponding element in the first embodiment (see FIGS. 15–19) is provided. The movable base 27, including the turntable 24 and the optical pickup unit 25 provided therein, is moved up to the raised position in the same manner as in the disk apparatus 11 of the first embodiment. The cartridge 45 on the turntable 24 in the movable base 27 is clamped between the clamper 44 and the turntable 24, as shown in FIG. 24. The disk 43 in the cartridge 45 on the turntable 24 in the movable base 27 is held at the read/write position. The pickup unit 25 is used to read data from or write data to a recording layer of the disk 43 at the read/write position.

When an ejecting operation is performed by the operator, the movable base 27 is moved down to the lowered position. At the same time, the motor 98 starts rotation in a rotating direction reverse to the rotating direction of the motor 98 in the above-described disk loading procedure. The cartridge 45, latched by the clamp members 94, is moved relative to the chassis 22 in the direction A, together with the slide member 91, in response to the reverse rotation of the motor 98. When the slide member 91 has returned to the position shown in FIG. 20, the connecting portions 94a of the clamp members 94 are connected to the pins 96 on the base 22b of the chassis 22.

The clamp members 94 are rotated outwardly by the connection of the connecting portions 94a and the pins 96 as shown in FIG. 20, and the connecting portions 94a are disconnected from the side recesses 45e of the cartridge 45. The cartridge 45 is separated from the clamp members 94, and this allows the operator to take the cartridge 45 out of the disk apparatus 90.

In the disk apparatus 90 of the present embodiment, during the forward movement of the cartridge 45 in the direction A after the ejecting operation, the cartridge 45 latched by the clamp members 95 on the slide member 91 passes over the turntable 24, and then the shutter arm 92 is rotated clockwise around the shaft 95 such that the shutter 45c in the cartridge 45 is shut by the connecting part 92c. The slide member 91 is provided in the disk apparatus 90 of the present embodiment and the disk tray 12 as in the disk apparatus 11 is not provided therein. However, the cartridge 45 in which the shutter 45c is opened by the connecting part 92a passes over the turntable 24 in the present embodiment. It is not necessary to set the entire height of the disk apparatus 90 at a raised position in order to avoid interference between the related elements. Therefore, the disk apparatus 90 of the present embodiment is effective in providing a small-height structure for an optical disk drive housed in a notebook-size personal computer. The support plate 5 on which the shutter lever 6 is rotatably supported as in the conventional disk apparatus is not required by the disk apparatus 90 of the present embodiment.

The disk apparatus 90 of the above-described embodiment can be applied to not only the optical disk drive capable of holding one of a CD-ROM and a PD disk cartridge on a disk tray as in the above-described embodiment, but also a compact disk drive, a magnetic disk drive, a magneto-optical disk drive, and other optical disk drives.

Further, the present invention is not limited to the above-described embodiments, and variations and modifications may be made without departing from the scope of the present invention.

What is claimed is:

1. A disk apparatus for reading information from or writing information to a recording surface of a disk contained in a disk cartridge, the disk cartridge having a shutter, said disk apparatus comprising:

a chassis having a base, said chassis being fixed with respect to a cartridge inserting direction and a cartridge ejecting direction that are substantially parallel to the recording surface of the disk in the cartridge:

a slide member provided on the chassis so that the slide member is movable relative to the fixed chassis in a direction substantially parallel to both the recording surface of the disk and the cartridge inserting direction when the disk cartridge is inserted; and a shutter arm provided on the slide member for opening the shutter in the cartridge when inserted, said shutter arm having a connecting part, said connecting part being movable between a first position and a second position, said connecting part being connected at the first position to the shutter by the insertion of the cartridge, said connecting part being moved from the first position to the second position in response to the insertion of the cartridge, so that the shutter in the cartridge is opened by said connecting part.

2. The disk apparatus according to claim 1, wherein said slide member is a disk tray for holding the disk cartridge thereon, the tray being movable relative to the chassis between a disk-change position and a disk-loaded position.

3. The disk apparatus according to claim 1, wherein said chassis has a rack on the base of the chassis, and said shutter arm comprises a gear capable of being engaged with the rack, and wherein said gear is rotated by the movement of the slide member relative to the chassis through engagement between the gear and the rack, thereby moving the connecting part from the first position to the second position.

4. The disk apparatus according to claim 3, wherein said gear of said shutter arm is provided such that the gear is located beneath the slide member when the shutter in the cartridge is opened by the shutter arm.

5. The disk apparatus according to claim 1, wherein said chassis has a rack on the base of the chassis, and said shutter arm comprises a first arm and a second arm, said first arm being rotatably supported on the slide member at one end of the first arm and linked at the other end with the second arm, said first arm having an integrally formed gear, said gear capable of being engaged with the rack, said second arm having a leading edge movably supported on a rear surface of the slide member, said connecting part being provided at the leading edge of said second arm.

6. The disk apparatus according to claim 5, wherein the first arm and the second arm are held in an L-shaped condition before the cartridge is inserted, and wherein the first arm is rotated by the movement of the slide member in response to the insertion of the cartridge, so that the first arm and the second arm are held in a straight-line condition while the shutter in the cartridge is opened by the connecting part.

7. The disk apparatus according to claim 6, wherein the rear surface of the slide member has an arm receiving portion extending along the rear surface of the slide member, the first arm and the second arm having a U-shaped cross section, and wherein the first arm and the second arm of the shutter arm are fitted into the arm receiving portion of the rear surface of the slide member when the first arm and the second arm are held in the straight-line condition.

8. The disk apparatus according to claim 5, further comprising a spring for actuating the first arm of the shutter arm so as to rotate the first arm around a corner of the slide member in one of a clockwise rotating direction and a counterclockwise rotating direction, said spring being connected at one end to the slide member and connected at the other end to the gear of the first arm.

9. The disk apparatus according to claim 5, wherein, when the connecting part of the shutter arm is set at the second position, the shutter arm is joined onto the slide member, such that a position of the shutter arm substantially accords with a position of the slide member.

10. The disk apparatus according to claim 1, further comprising a plurality of clamp members provided on the slide member for clamping the cartridge when inserted, each of the plurality of clamp members having a connecting portion, the connecting portions of the plurality of clamp members being connected to side recesses of the cartridge in response to the insertion of the cartridge, so that the cartridge is latched by the plurality of clamp members.

11. The disk apparatus according to claim 10, further comprising a slide member drive unit provided on the base of the chassis for moving the slide member relative to the chassis in one of the inserting direction and an ejecting direction, so that the cartridge latched by the plurality of clamp members is moved between a disk-change position and a disk-loaded position by the movement of the slide member.

12. The disk apparatus according to claim 1, wherein, when the connecting part of the shutter arm is set at the second position, the shutter arm is joined onto the slide member, such that a position of the shutter arm substantially accords with a position of the slide member.

* * * * *